US010621125B2

(12) United States Patent
Tsuji et al.

(10) Patent No.: US 10,621,125 B2
(45) Date of Patent: Apr. 14, 2020

(54) IDENTIFIER-BASED PACKET REQUEST PROCESSING

(71) Applicant: NEC Corporation, Minato-ku, Tokyo (JP)

(72) Inventors: Akira Tsuji, Tokyo (JP); Masaki Kan, Tokyo (JP); Jun Suzuki, Tokyo (JP); Yuki Hayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/310,865

(22) PCT Filed: Jun. 21, 2017

(86) PCT No.: PCT/JP2017/022860
§ 371 (c)(1),
(2) Date: Dec. 18, 2018

(87) PCT Pub. No.: WO2018/003629
PCT Pub. Date: Jan. 4, 2018

(65) Prior Publication Data
US 2019/0179784 A1    Jun. 13, 2019

(30) Foreign Application Priority Data

Jun. 28, 2016  (JP) .................................. 2016-127411

(51) Int. Cl.
*G06F 13/24* (2006.01)
*G06F 13/36* (2006.01)
(Continued)

(52) U.S. Cl.
CPC .......... *G06F 13/24* (2013.01); *G06F 9/45558* (2013.01); *G06F 13/122* (2013.01);
(Continued)

(58) Field of Classification Search
CPC combination set(s) only.
See application file for complete search history.

(56) References Cited

U.S. PATENT DOCUMENTS 5,673,399 A      9/1997   Guthrie et al.
7,293,094 B2 *   11/2007  Vaman ................... H04L 47/10
                                                               370/353

(Continued)

FOREIGN PATENT DOCUMENTS

JP   H09-146878 A    6/1997
JP   2006-195948 A   7/2006

(Continued)

OTHER PUBLICATIONS

International Search Report for PCT Application No. PCT/JP2017/022860, dated Sep. 5, 2017.

(Continued)

*Primary Examiner* — Raymond N Phan

(57) ABSTRACT

A packet processing device is connected as a route of a plurality of I/O devices and configures a PCIe fabric. The packet processing device includes a plurality of first request processing units and a second request processing unit that process a PCIe packet issuing request to the I/O device; and a first selecting unit that selects the plurality of first request processing units or the second request processing unit, based on a request classification of the PCIe packet issuing request, and a load exerted on the PCIe fabric by a packet to be transmitted to the I/O device. The first selecting unit includes a first determining unit that determines whether the PCIe packet issuing request is possible to pass another PCIe packet issuing request being processed by the first request processing unit, based on a transaction identifier included in the PCIe packet issuing request.

7 Claims, 18 Drawing Sheets

(51) Int. Cl.
*G06F 13/20* (2006.01)
*G06F 9/455* (2018.01)
*G06F 13/12* (2006.01)
*G06F 13/30* (2006.01)
*G06F 13/364* (2006.01)
*G06F 13/40* (2006.01)

(52) U.S. Cl.
CPC .............. *G06F 13/20* (2013.01); *G06F 13/30* (2013.01); *G06F 13/36* (2013.01); *G06F 13/364* (2013.01); *G06F 13/4031* (2013.01); *G06F 2009/45579* (2013.01); *G06F 2213/0026* (2013.01)

(56) References Cited

U.S. PATENT DOCUMENTS

| | | | | |
|---|---|---|---|---|
| 8,010,719 B2* | 8/2011 | Moriki | .................... | G06F 13/36 710/22 |
| 2005/0097384 A1* | 5/2005 | Uehara | ............... | G06F 12/1081 714/1 |
| 2006/0236094 A1* | 10/2006 | Leung | .................... | G06F 9/4812 713/152 |
| 2008/0172499 A1 | 7/2008 | Moriki et al. | | |
| 2010/0153592 A1* | 6/2010 | Freimuth | ............ | G06F 13/4022 710/38 |
| 2010/0165874 A1* | 7/2010 | Brown | ................ | G06F 13/4022 370/254 |
| 2012/0166690 A1* | 6/2012 | Regula | .................. | G06F 13/404 710/104 |
| 2012/0221764 A1 | 8/2012 | Glass et al. | | |

FOREIGN PATENT DOCUMENTS

| | | |
|---|---|---|
| JP | 2008-176482 A | 7/2008 |
| JP | 4996929 B2 | 8/2012 |
| JP | 2014-509427 A | 4/2014 |

OTHER PUBLICATIONS

English translation of Written opinion for PCT Application No. PCT/JP2017/022860.

* cited by examiner

Fig. 4

| REQUEST PROCESSING UNIT ID | TRANSACTION ID | | REQUEST CLASSIFICATION |
|---|---|---|---|
| | REQUESTER ID | TAG | |
| COMPLETION PROCESSING UNIT 0 | 02.0.0 | 1 | COMPLETION |
| COMPLETION PROCESSING UNIT 1 | UNALLOCATED | UNALLOCATED | UNALLOCATED |
| COMPLETION PROCESSING UNIT 2 | 16.0.0 | 1 | COMPLETION |
| ... | ... | ... | ... |
| LOW LOAD REQUEST PROCESSING UNIT | 25.0.0 | 1 | POSTED REQUEST |

Fig. 6

| REQUEST PROCESSING UNIT ID | REQUESTER ID | REQUEST CLASSIFICATION |
|---|---|---|
| MEMORY WRITE REQUEST PROCESSING UNIT 0 | 02.0.0 | COMPLETION |
| MEMORY WRITE REQUEST PROCESSING UNIT 1 | UNALLOCATED | UNALLOCATED |
| MEMORY WRITE REQUEST PROCESSING UNIT 2 | 16.0.0 | COMPLETION |
| ... | ... | ... |
| LOW LOAD REQUEST PROCESSING UNIT | 25.0.0 | POSTED REQUEST |

| TRANSACTION ID (590) || REMAINING TRANSFER SIZE (591) | PROCESSING UNIT LOAD (592) |
| --- | --- | --- | --- |
| REQUESTER ID | TAG | | |
| 02.0.0 | 1 | 1MByte | HIGH LOAD |
| 16.0.0 | 2 | 10MByte | HIGH LOAD |
| 25.0.0 | 1 | 1KByte | LOW LOAD |

Fig. 14

| I/O DEVICE ID | THRESHOLD |
|---|---|
| 02.0.0 | 1MB |
| 16.0.0 | 1MB |
| 25.0.0 | MAX_VALUE |

IDENTIFIER-BASED PACKET REQUEST PROCESSING

This application is a National Stage Entry of PCT/JP2017/022860 filed on Jun. 21, 2017, which claims priority from Japanese Patent Application 2016-127411 filed on Jun. 28, 2016, the contents of all of which are incorporated herein by reference, in their entirety.

TECHNICAL FIELD

One embodiment of the present invention relates to a packet processing device and the like, and particularly, to data transfer of an input/output (I/O) device.

BACKGROUND ART

PCI Express (registered trademark) (hereinafter, abbreviated as PCIe (registered trademark)) is used for connecting peripheral equipment or a peripheral device (hereinafter, referred to as an I/O device) and a central processing unit (CPU) in a computer such as a server or a personal computer (PC).

FIG. 18 illustrates a configuration example of a computer 1A employing PCIe. Referring to FIG. 18, the computer 1A includes a CPU 2, a memory controller 3, a memory 4, a PCIe route complex 5A, a PCIe switch 6, and I/O devices 7. Note that the memory controller 3 and the PCIe route complex 5A may be incorporated in the CPU 2.

PCIe configures a tree port type network in which the PCIe route complex 5A is used as a route (hereinafter, this network is referred to as a PCIe fabric). The PCIe switch 6 for switching a PCIe packet, and the I/O devices 7 are connected to the PCIe fabric. Note that the PCIe route complex 5A, the PCIe switch 6, or the I/O device 7 may also be referred to as a PCIe device.

In PCIe, the PCIe route complex 5A or the PCIe switch 6 switches a PCIe packet toward a PCIe device being a destination (e.g. an I/O device 7) by using information on a transaction layer located at a third layer of a PCIe protocol layer.

There are various species of I/O devices 7. For example, there are a network interface card (NIC) for performing communication between computers via a network, a graphics processing unit (GPU) for displaying an image on a display, and a recommended standard 232 version C (RS-232C) device being an interface for serial communication.

These I/O devices 7 transmit and receive data to and from a PCIe fabric at various data transfer rates. For example, in a case of an NIC associated with Ethernet (registered trademark), communication is performed between computers 1A at a communication speed such as 1 Gbps, 2.5 Gbps, 10 Gbps, or 40 Gbps. Therefore, an NIC transmits and receives data to and from the memory 4 at a substantially same data transfer rate in a PCIe fabric via the PCIe route complex 5A and the memory controller 3. This data transmission and reception is referred to as a direct memory access (DMA), and is performed between the memory 4 and an I/O device 7 without using a resource of the CPU 2.

There are two species of DMAs, namely, a DMA Read for reading data from the memory 4, and a DMA Write for writing data in the memory 4. When a DMA Read is performed, in PCIe, first of all, an I/O device 7 issues a memory read request. The memory read request includes information on a length of read data indicating from which area in the memory 4 and how many bytes of data are read.

A memory read request is sent to the memory controller 3 through the PCIe route complex 5A. Further, the memory controller 3 reads, from the memory 4, data in an area designated by the memory read request by a designated size. The read data are transferred to an I/O device 7 that issues the memory read request, through the PCIe route complex 5A. In the PCIe route complex 5A, a header of a packet of a classification called a completion among PCIe packets is attached to the data read from the memory 4, and the data are transmitted to the PCIe fabric.

When a size of data to be read from the memory 4 by using a DMA Read exceeds a size of data transmittable by one PCIe packet, the data read from the memory 4 are divided into a plurality of completion packets, and delivered to an I/O device 7 that issues the memory read request.

In other words, in a DMA Read, whereas a PCIe packet of one memory read request flows in a direction from the I/O device 7 to the PCIe route complex 5A (hereinafter, referred to as an Up direction), one or more PCIe packets flow in a direction from the PCIe route complex 5A to the I/O device 7 (hereinafter, referred to as a Down direction).

In a case of a DMA Write, an I/O device 7 issues a PCIe packet of a memory write request. The memory write request includes an address designating an area being a writing destination, a transfer size, and data to be written.

When a size of data to be written in the memory 4 exceeds a size of data transmittable by one PCIe packet, the data are delivered to the memory 4 by using a plurality of PCIe packets of memory write requests.

Note that a memory write request is a request of a classification called a posted request in PCIe, and a party that receives the request does not have to return a response. This response is a completion pointed out in description about a DMA Read. A memory read request to be issued when a DMA Read is performed is a classification called a non-posted request. In a non-posted request, a party that receives the request always has to return a response (completion).

In other words, in a DMA Write, PCIe packets of a number required by an I/O device 7 flow in an Up direction, and a PCIe packet does not flow in a Down direction.

PTL 1 discloses an I/O controller capable of analyzing a header of a memory read request, determining a priority of processing of the memory read request, based on a transfer size and the like, and inputting the memory read request to a request queue depending on the priority.

The I/O controller in PTL 1 employs a server virtualization environment as a target, and monitors a processing status of a DMA for each virtual machine. Further, when a request accompanying a DMA such as a memory read request or a memory write request is issued from an I/O device, the I/O controller identifies a virtual machine being a transfer destination, and inputs the request to a request queue to which a priority is given, depending on an execution status of a DMA of the virtual machine.

In this way, there is a technique of preventing a specific virtual machine from occupying a resource of a PCIe fabric, when the resource of the PCIe fabric (in this case, a band) is shared and used by a plurality of virtual machines.

Further, in PTL 1, individual request queues are provided to a non-posted request, a posted request, and a completion, respectively. Further, by fixing a priority with which a request is extracted from these request queues, an ordering rule among requests defined in a PCIe specification is satisfied.

The ordering rule among requests in PCIe is a rule that determines whether or not passing is possible between requests, and between a request and a completion. For example, basically, a non-posted request cannot pass a posted request.

In most cases, this ordering rule determines whether or not passing is possible by a combination of a request classification including a completion, and a flag relating to an ordering included in a header of a PCIe packet or identification information on a request.

In PCIe, there is a configuration that determines two species of ordering rules, namely, a relaxed ordering (hereinafter, referred to as an RO), and an ID-based ordering (hereinafter, referred to as an IDO) by using information on a transaction layer packet (TLP) header of a PCIe packet.

Both of an RO and an IDO determine which ordering rule is applied by setting an appropriate value to an Attribute field of a TLP header. It is possible to use one of an RO and an IDO, or both of an RO and an IDO simultaneously.

By using an RO, a certain posted request is possible to pass a posted request that is issued prior to the certain posted request, a certain non-posted request is possible to pass a posted request that is issued prior to the certain non-posted request, and a certain completion is possible to pass a posted request that is issued prior to the certain completion.

Further, by using an IDO, passing between posted requests having a same request identifier, and the like are enabled. This request identifier is constituted of a combination of information on a tag field, and a requester identification (ID), which are included in a TLP header. The requester ID is an identifier in a PCIe fabric of a PCIe device that issues a request. A requester ID is constituted of a combination of three values, namely, a bus number, a device number, and a function number, and is also referred to as a BDF (registered trademark) number by using initials of the names of the respective numbers.

Further, PTL 2 describes that, regarding passing between transactions according to a PCIe specification, a posted transaction has a high priority, and is possible to pass a non-posted transaction or a completion.

Further, PTL 3 describes that, in order to efficiently handle multitudes of transactions that co-exist in a host bridge in both directions, namely, in an inbound direction and an outbound direction, inbound and outbound transaction requests are handled successively or non-successively, based on a specific classification of transaction and a defined ordering rule under control of a predetermined state machine.

CITATION LIST

Patent Literature

[PTL 1] Japanese Patent No. 4996929
[PTL 2] Japanese Translation of PCT International Application Publication No. 2014-509427
[PTL 3] Japanese Unexamined Patent Application Publication No. H9-146878

SUMMARY OF INVENTION

Technical Problem

In the technique disclosed in PTL 1, there is an issue that passing between requests of a same classification, or request passing between completions is not possible. This is because the technique disclosed in PTL 1 does not consider ordering of requests among I/O devices.

For example, in the technique disclosed in PTL 1, passing between completions is not possible, and a response (completion) to a memory read request (=non-posted request) is processed in an order stacked in a queue for processing completions.

Therefore, for example, when a large amount of completions in response to a memory read request issued by a specific I/O device 7 are issued, processing of a completion in response to a memory read request issued by another I/O device may be greatly delayed.

In view of the above-described issue, an object of the present invention is to provide a packet processing device and the like, which prevent processing of a request by a certain I/O device from impeding processing of a request by another I/O device.

Solution to Problem

A packet processing device is connected as a route of a plurality of I/O devices and configures a PCIe fabric. The packet processing device includes a plurality of first request processing units and a second request processing unit that process a PCIe packet issuing request to the I/O device; and a first selecting unit that selects the plurality of first request processing units or the second request processing units, based on a request classification of the PCIe packet issuing request, and a load exerted on the PCIe fabric by a packet to be transmitted to the I/O device.

The first selecting units includes a first determining unit that determines whether the PCIe packet issuing request is possible to pass another PCIe packet issuing request being processed by the first request processing units, based on a transaction identifier included in the PCIe packet issuing request.

A packet processing device is connected as a route of a plurality of I/O devices and configures a PCIe fabric. The packet processing device includes a plurality of third request processing units and a fourth request processing unit that processes a transaction packet from the I/O device; and a second selecting unit that selects the plurality of third request processing units or the fourth request processing units, based on a classification of the transaction packet, and a load exerted on the PCIe fabric by the transaction packet from the I/O.

The second selecting units includes second determining unit that determine, when a classification of the transaction packet is the memory write request, whether the memory write request is possible to pass another memory write request being processed by the third request processing units, based on a requester identifier included in the memory write request.

A packet processing device is connected as a route of a plurality of I/O devices and configures a PCIe fabric. The packet processing device includes a plurality of first request processing units and a second request processing unit that process a PCIe packet issuing request to the I/O device.

A packet processing method for the packet processing device includes selecting the plurality of first request processing units or the second request processing units, based on a request classification of the PCIe packet issuing request, and a load exerted on the PCIe fabric by a packet to be transmitted to the I/O device, and, in case of performing the selection, determining whether the PCIe packet issuing request is possible to pass another PCIe packet issuing request being processed by the first request processing units, based on a transaction identifier included in the PCIe packet issuing request.

A packet processing device is connected as a route of a plurality of I/O devices and configures a PCIe fabric. The packet processing device includes a plurality of third request processing units and a fourth request processing unit that processes a transaction packet from the I/O device.

A packet processing method for the packet processing device includes selecting the plurality of third request processing units or the fourth request processing units, based on a classification of the transaction packet, and a load exerted on the PCIe fabric by the transaction packet from the I/O device, and, in case of performing the selection, determining, when a classification of the transaction packet is the memory write request, whether the memory write request is possible to pass another memory write request being processed by the third request processing units, based on a requester identifier included in the memory write request.

Advantageous Effects of Invention

According to one embodiment of the present invention, it is possible to prevent processing of a request by a certain I/O device from impeding processing of a request by another I/O device.

BRIEF DESCRIPTION OF DRAWINGS

FIG. 4 is a table diagram illustrating a configuration example of a Down request issuing status management table.

FIG. 6 is a table diagram illustrating a configuration example of an Up direction request issuing status management table.

FIG. 13 is a table diagram illustrating a configuration example of a completion table.

FIG. 14 is a table diagram illustrating a configuration example of a Down direction I/O device table in the second example embodiment.

EXAMPLE EMBODIMENT

A packet processing device according to an example embodiment of the present invention is described with reference to the drawings. Note that drawings and reference signs described in the following description are provided for each element, as an example for aiding understanding for convenience, and do not intend to limit the present invention to illustrated aspects.

In the following, a packet processing device according to an example embodiment is described by using an example in which the packet processing device is applied to a PCIe route complex of a computer.

Figure 1:
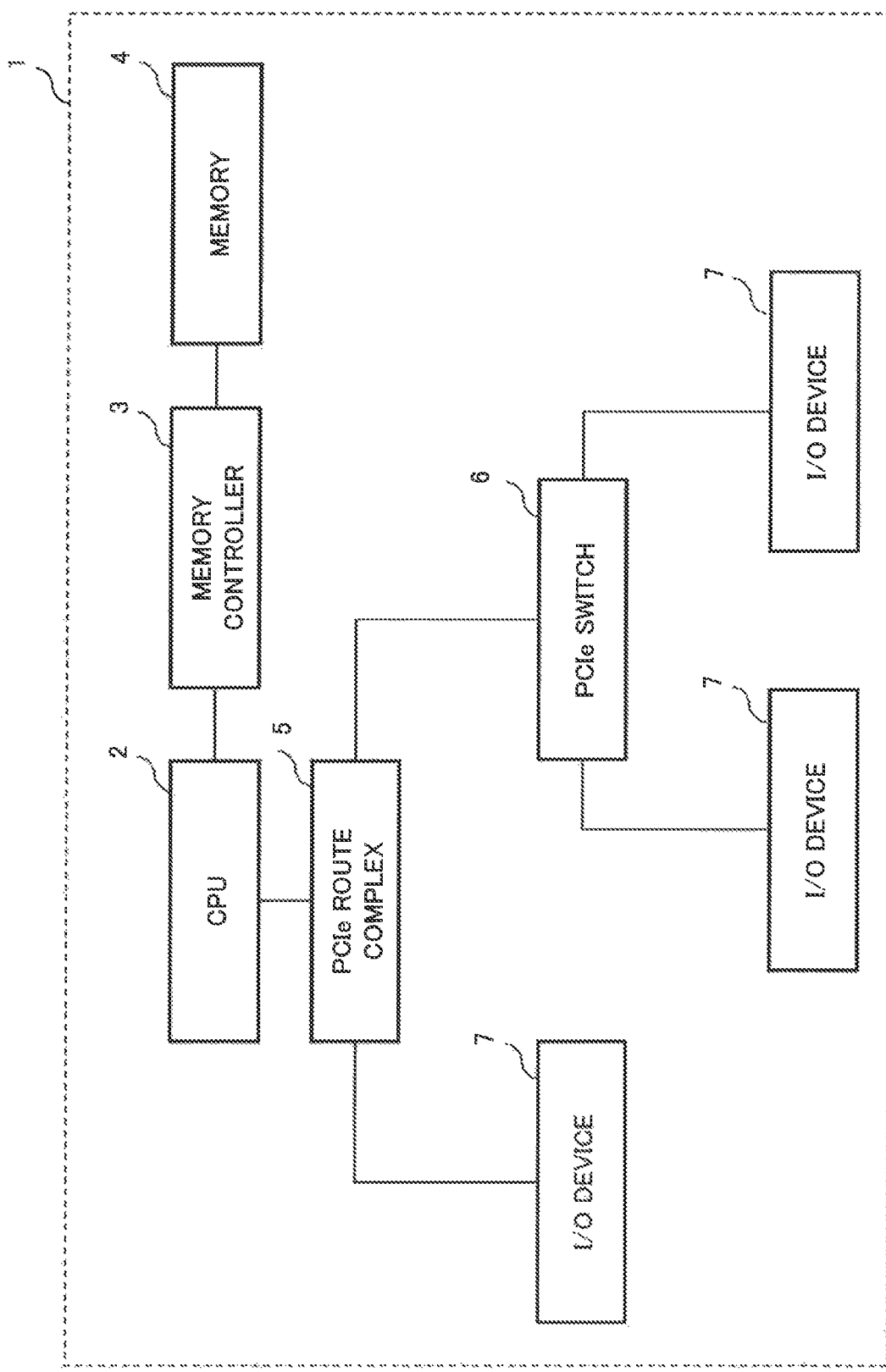
FIG. 1 is a block diagram illustrating a configuration of a computer employing PCI Express.
Figure 18:
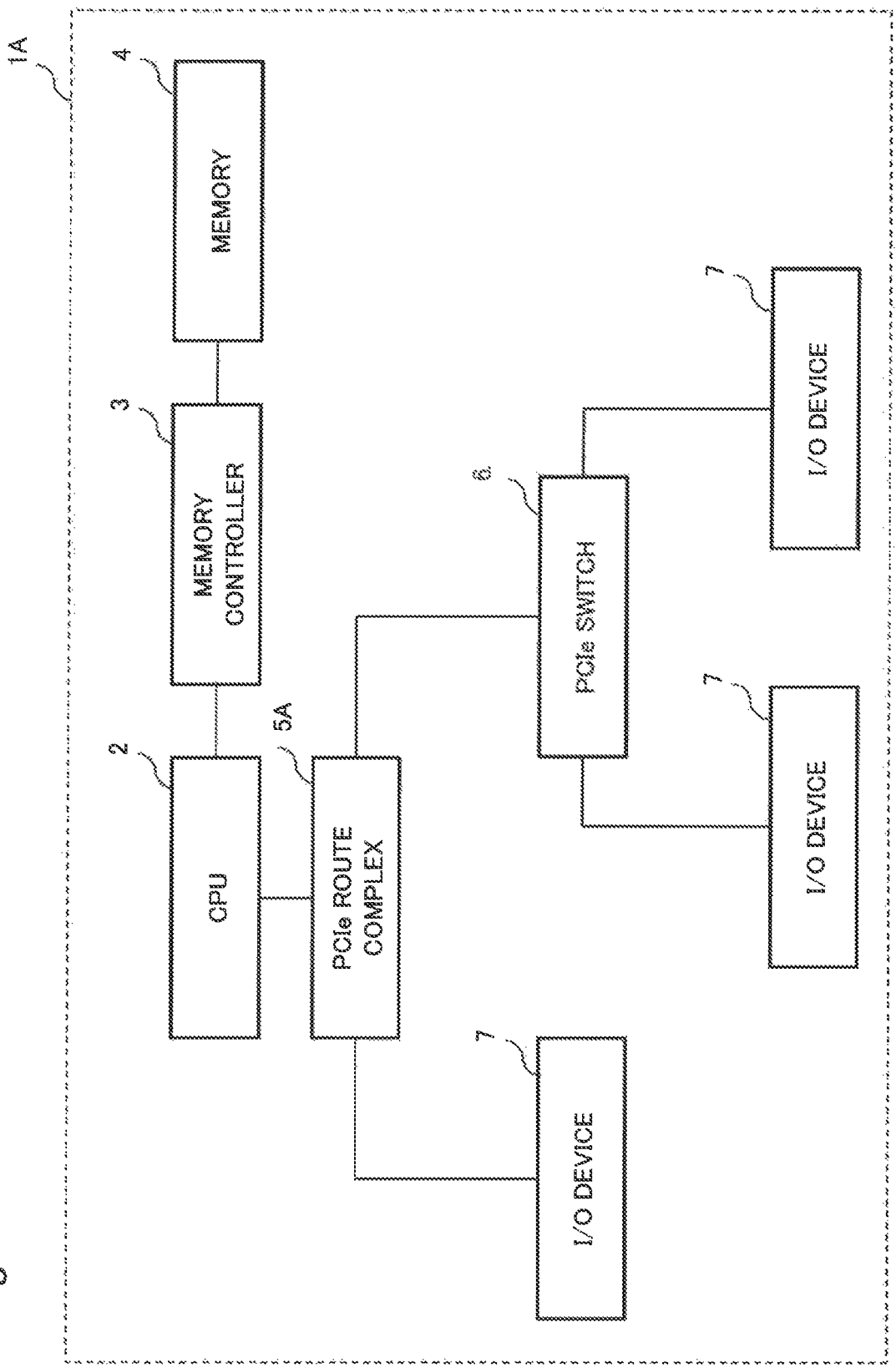
FIG. 18 is a block diagram illustrating a configuration of a computer employing general PCI Express.

FIG. 1 is a diagram illustrating a configuration example of a computer 1 employing PCIe. Referring to FIG. 1, the computer 1 includes a CPU 2, a memory controller 3, a memory 4, a PCIe route complex 5, a PCIe switch 6, and I/O devices 7. Note that the memory controller 3 and the PCIe route complex 5 may be incorporated in the CPU 2. Since the CPU 2, the memory controller 3, the memory 4, the PCIe route complex 5, the PCIe switch 6, and the I/O devices 7 are similar to the constituent elements of the computer 1A illustrated in FIG. 18, these constituent elements are indicated with same reference signs, and detailed description thereof is omitted.

Further, in order to simplify description, an example is described in which a PCIe ordering rule employing an IDO as a target is used. It is needless to say that the present example embodiment is not limited to an IDO, but is also applicable to a computer employing an RO as a target. Alternatively, the present example embodiment is also applicable to a computer employing both of an IDO and an RO, or to a computer in which a similar configuration is employing in an ordering rule according to a similar method.

Further, it is assumed that a route complex is in a state that the route complex is possible to support and use an IDO. Regarding an I/O device, the I/O device may support an IDO or may not support an IDO.

First Example Embodiment

Description of Configurations

Figure 2:
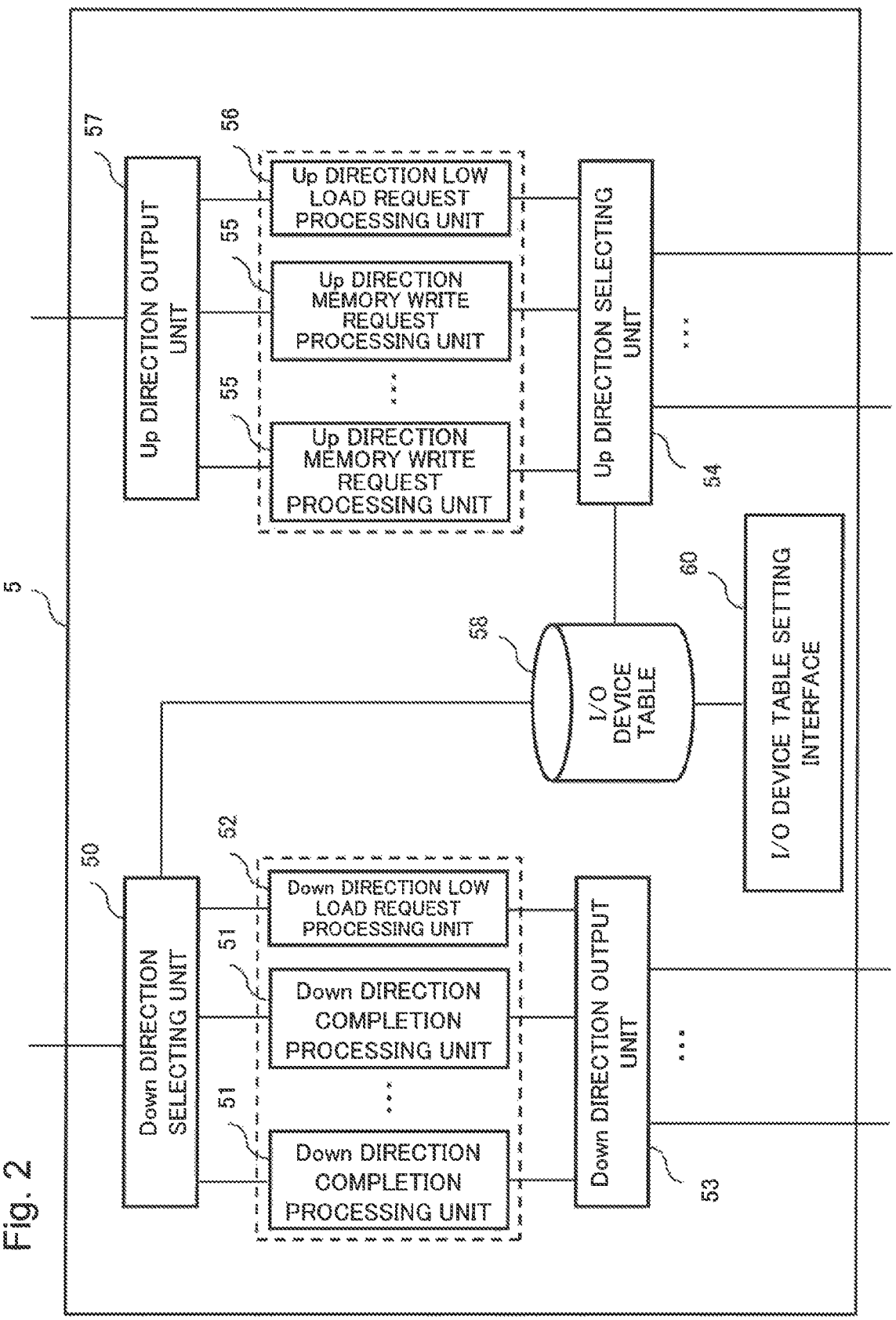
FIG. 2 is a block diagram illustrating a configuration of a PCIe route complex according to a first example embodiment.

FIG. 2 is a block diagram illustrating a configuration of a PCIe route complex 5 according to a first example embodiment of the present invention. Referring to FIG. 2, the PCIe route complex 5 includes a Down direction selecting unit 50, a plurality of Down direction completion processing units 51, a Down direction low load request processing unit 52, a Down direction output unit 53, an Up direction selecting unit 54, a plurality of Up direction memory write request processing units 55, an Up direction low load request processing unit 56, an Up direction output unit 57, an I/O device table 58, and an I/O device table setting interface 60.

First of all, a configuration in which the PCIe route complex 5 performs processing in a Down direction (direction from the PCIe route complex 5 to an I/O device 7) is described.

The Down direction selecting unit 50 has a function of selecting which one of a posted request issuing request, a non-posted request issuing request, or a completion issuing request in a Down direction (hereinafter, these requests are generically referred to as a PCIe packet issuing request) is processed by the Down direction completion processing unit 51 or the Down direction low load request processing unit 52. Note that each of the Down direction completion processing unit 51 and the Down direction low load request processing unit 52 may be referred to as a Down direction request processing unit.

The Down direction selecting unit 50 selects either the Down direction completion processing unit 51 or the Down direction low load request processing unit 52 by referring to a request classification of a PCIe packet issuing request, and information in the I/O device table 58. The Down direction selecting unit 50 notifies the selected Down direction completion processing unit 51 or the selected Down direction low load request processing unit 52 of a PCIe packet issuing request from the CPU 2 or the memory controller 3.

A PCIe packet issuing request includes information necessary for configuring a TLP such as a request classification, a requester ID, a tag, a transfer data size, data to be transferred, or a memory address. Information necessary for configuring a TLP differs for each request classification. Specifically, the information is disclosed in a PCIe specification. Note that, when a completion TLP is configured, information on an identifier identifying a PCIe device being an issuing source of a completion TLP called a completer ID is necessary. In the first example embodiment, since the PCIe route complex 5 becomes an issuing source of a completion TLP, a completer ID becomes an identifier of the PCIe route complex 5.

Figure 3:
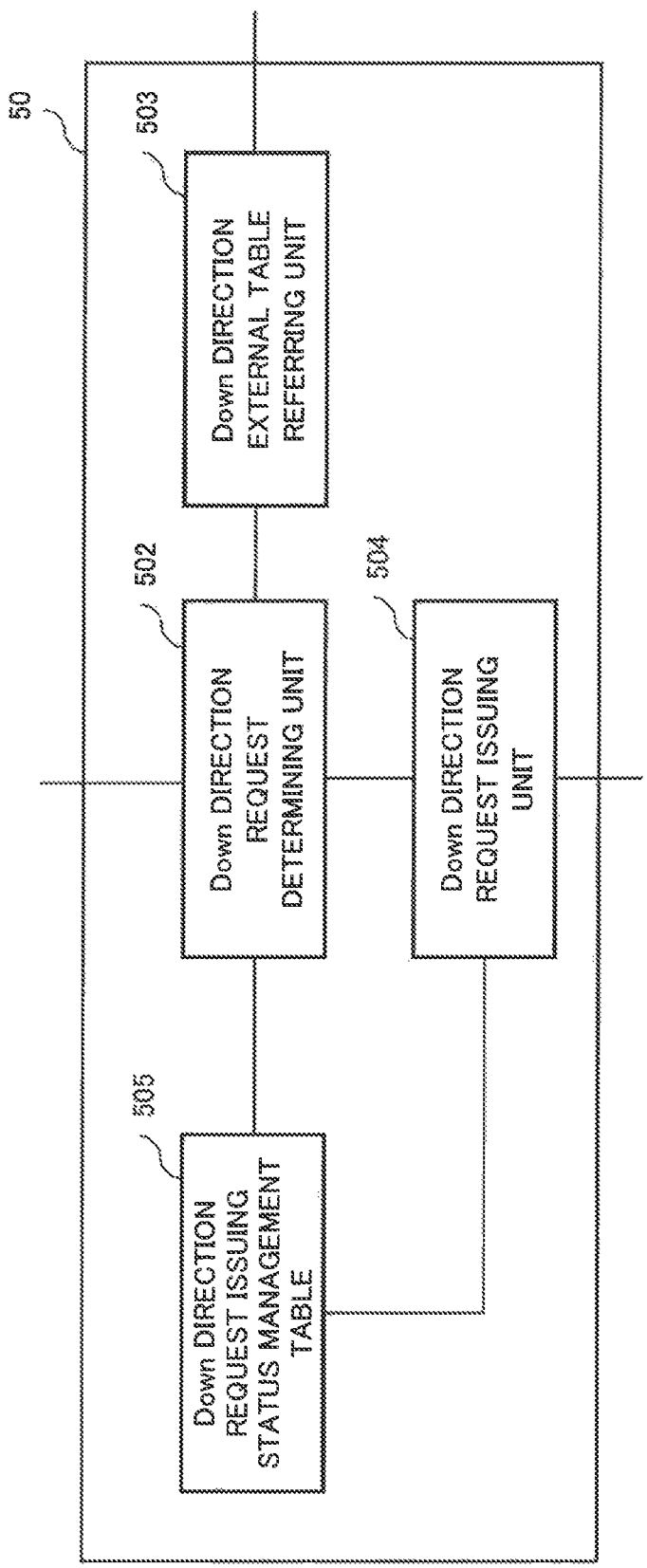
FIG. 3 is a block diagram illustrating a configuration of a Down direction selecting unit of the PCIe route complex.

A configuration of the Down direction selecting unit 50 of the PCIe route complex 5 is described. FIG. 3 is a block diagram illustrating a configuration of the Down direction selecting unit 50. Referring to FIG. 3, the Down direction selecting unit 50 includes a Down direction request determining unit 502, a Down direction external table referring unit 503, a Down direction request issuing unit 504, and a Down direction request issuing status management table 505.

The Down direction request determining unit 502 is a module for determining by which one of the Down direction request processing units, a PCIe packet issuing request issued from the CPU 2 and the like is processed. The Down direction request determining unit 502 determines a Down direction request processing unit that processes the request by referring to the I/O device table 58 and the Down direction request issuing status management table 505. The Down direction request determining unit 502 delivers, to the Down direction request issuing unit 504, a PCIe packet issuing request together with an identifier of a Down direction request processing unit that processes the request.

The Down direction external table referring unit 503 is an interface for referring to an external table of the Down direction selecting unit 50 (e.g., the I/O device table 58 in FIG. 2).

Further, the Down direction request determining unit 502 acquires load information indicating whether or not an I/O device 7 being a transmission destination of a PCIe packet is an I/O device accompanying high-load data transfer by referring to an external table of the Down direction selecting unit 50 through the Down direction external table referring unit 503.

The Down direction request issuing unit 504 receives, from the Down direction request determining unit 502, a PCIe packet issuing request, and an identifier of a Down direction request processing unit that processes the request, and transfers the PCIe packet issuing request to the Down direction request processing unit indicated by the identifier.

When transferring a PCIe packet issuing request to a Down direction request processing unit, the Down direction request issuing unit 504 records information on a transmitted PCIe packet issuing request in the Down direction request issuing status management table 505. Further, when receiving, from the Down direction request processing unit, a processing completion notification indicating that processing of the PCIe packet issuing request is completed, the Down direction request issuing unit 504 deletes, from the Down direction request issuing status management table 505, information on the associated PCIe packet issuing request.

The Down direction request issuing status management table 505 is a table for managing information on a PCIe packet issuing request being processed by a Down direction request processing unit.

FIG. 4 is a diagram illustrating a configuration of the Down direction request issuing status management table 505.

Referring to FIG. 4, the Down direction request issuing status management table 505 is a table for holding, as an entry, a correspondence among an identifier of a Down direction request processing unit (a request processing unit ID 5050 in FIG. 4), a transaction ID (a transaction ID 5051 in FIG. 4), and a request classification of a PCIe packet issuing request being processed by each of the Down direction request processing units (a request classification 5052 in FIG. 4: one of a posted request, a non-posted request, and a completion).

In FIG. 4, completion processing units 0, 1, and 2 of the request processing unit ID 5050 indicate identifiers of the plurality of the Down direction completion processing units 51, and the low load request processing unit indicates an identifier of the Down direction low load request processing unit 52.

Each time the Down direction request issuing unit 504 issues a PCIe packet issuing request to a Down direction request processing unit, the Down direction request issuing unit 504 registers, in the Down direction request issuing status management table 505, a requester ID and a transaction ID including a tag, as an entry associated with the Down direction request processing unit being an issuing destination.

Further, when receiving, from a Down direction request processing unit, a processing completion notification indicating that processing of a PCIe packet issuing request is completed, the Down direction request issuing unit 504 deletes, from the Down direction request issuing status management table 505, a transaction ID and a request classification in an entry associated with the Down direction request processing unit that issues the processing completion notification.

A Down direction request processing unit generates a TLP, based on a PCIe packet issuing request notified from the Down direction selecting unit 50. The generated TLP is transferred to the Down direction output unit 53.

Note that, in order to avoid a situation that processing is concentrated only on a specific one of the Down direction completion processing units 51, processing of the Down direction completion processing units 51 may be performed in an order by round-robin, for example. Further, when a PCIe route complex is implemented by means of a software by a virtualization technique, a configuration in which a different CPU resource is allocated may be adopted.

Next, the Down direction output unit 53 includes at least one output port. It is possible to connect one I/O device 7, one PCIe switch 6, and the like to each of the output ports.

The Down direction output unit 53 selects an output port, based on destination information included in a header of a TLP, and outputs a TLP transferred from a Down direction request processing unit toward an I/O device 7 being a destination.

As destination information included in a header of a TLP, there are a case that a BDF number is used, and a case that a memory address is designated. The Down direction output unit 53 has a management table for managing as to which I/O device 7 or PCIe switch 6 having a BDF number, and which I/O device 7 or PCIe switch 6 having an allocated address area is connected to each of the output ports. Typically, a management table has a table structure such that a BDF number or an address area is a key, and an identifier of an output port is a value.

Next, a configuration in which the PCIe route complex 5 performs processing in an Up direction (direction from an I/O device 7 to the PCIe route complex 5) is described.

The Up direction selecting unit 54 has a function of selecting the Up direction memory write request processing unit 55 or the Up direction low load request processing unit 56, based on a request classification included in a header of a TLP transmitted from an I/O device 7 or the PCIe switch 6, and information on a requester ID. Note that each of the Up direction memory write request processing unit 55 and the Up direction low load request processing unit 56 may be referred to as an Up direction request processing unit.

Figure 5:
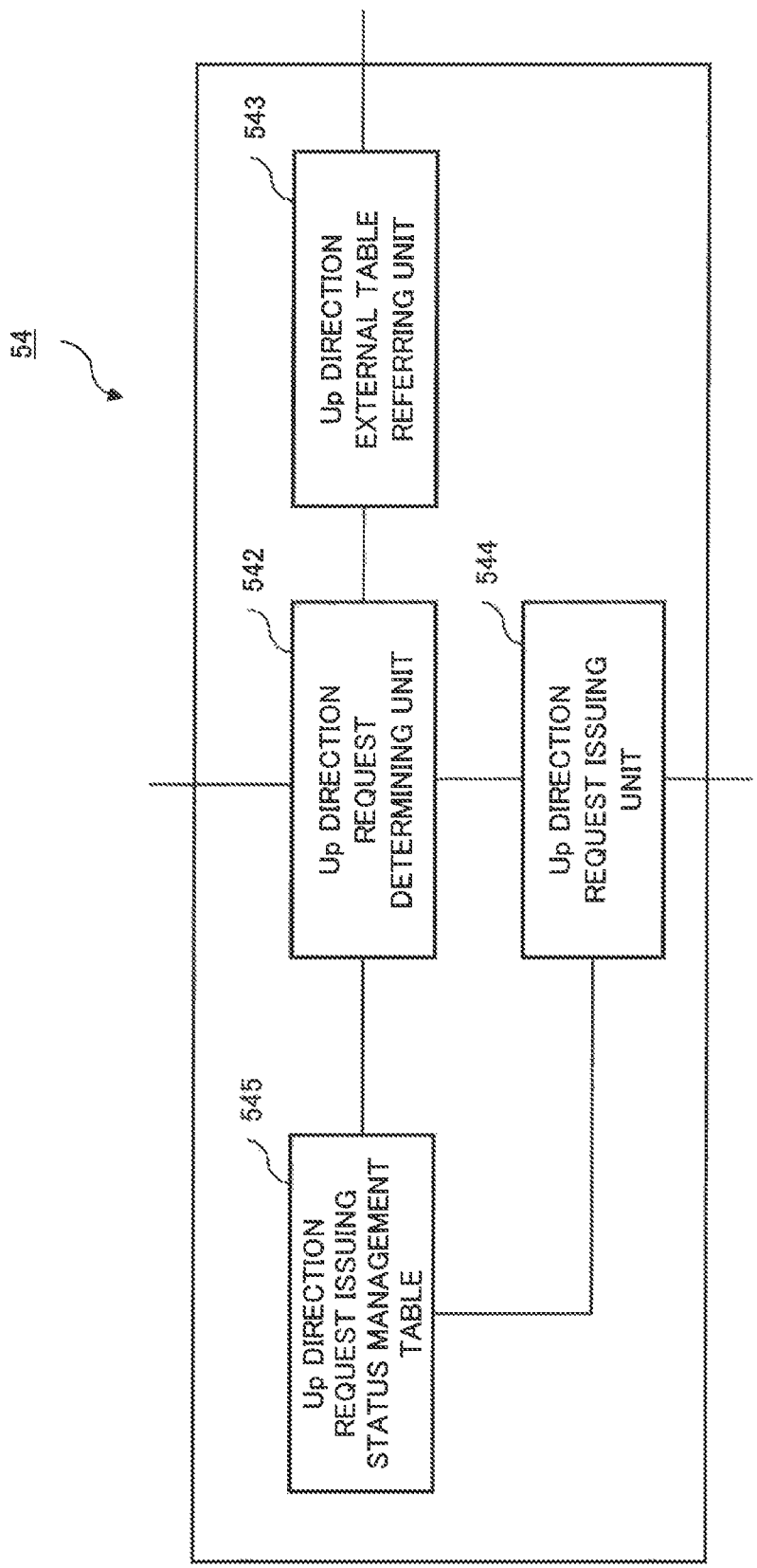
FIG. 5 is a block diagram illustrating a configuration of an Up direction selecting unit of the PCIe route complex.

A configuration of the Up direction selecting unit 54 is described. FIG. 5 is a block diagram illustrating a configuration of the Up direction selecting unit 54. The Up direction selecting unit 54 includes an Up direction request determining unit 542, an Up direction external table referring unit 543, an Up direction request issuing unit 544, and an Up direction request issuing status management table 545.

The Up direction request determining unit 542 is a module for determining to which one of the Up direction request processing units, a TLP received from an I/O device 7 or the PCIe switch 6 is transferred. The Up direction request determining unit 542 determines to which one of the Up direction request processing units, a received TLP is transferred by referring to the I/O device table 58 and the Up direction request issuing status management table 545. A TLP determined by the Up direction request processing unit being a transfer destination is delivered to the Up direction request issuing unit 544 together with an identifier of the Up direction request processing unit.

The Up direction external table referring unit 543 is an interface for referring to an external table of the Up direction selecting unit 54 (e.g., the I/O device table 58 in FIG. 2).

The Up direction request determining unit 542 acquires, through the Up direction external table referring unit 543, load information indicating whether or not an I/O device 7 being a transmission source of a TLP is an I/O device accompanying high-load data transfer by referring to the I/O device table 58 of the Up direction selecting unit 54.

The Up direction request issuing unit 544 receives, from the Up direction request determining unit 542, a TLP, and an identifier of an Up direction request processing unit that processes the TLP; and transfers the TLP to a Down direction request processing unit indicated by the identifier of the Up direction request processing unit.

After transferring the TLP to the Up direction request processing unit, the Up direction request issuing unit 544 records information on the transferred TLP in the Up direction request issuing status management table 545. Further, when receiving, from the Up direction request processing unit, a processing completion notification indicating that processing of the TLP is completed, the Up direction request issuing unit 544 deletes, from the Up direction request issuing status management table 545, information on the associated TLP.

The Up direction request issuing status management table 545 is a table for managing information on a TLP being processed by an Up direction request processing unit.

FIG. 6 is a table diagram illustrating a configuration example of the Up direction request issuing status management table 545.

Referring to FIG. 6, the Up direction request issuing status management table 545 is a table for holding, as an entry, a correspondence among an identifier of an Up direction request processing unit (a request processing unit ID 5450 in FIG. 6), a requester ID (a requester ID 5451 in FIG. 4), and a request classification of a PCIe packet issuing request being processed by each of the Up direction request processing units (a request classification in FIG. 6: a posted request, a non-posted request, or a completion). In the request processing unit ID 5450 illustrated in FIG. 6, memory write request processing units 0, 1, and 2 indicate identifiers of the Up direction memory write request processing units 55, and the low load request processing unit indicates an identifier of the Up direction low load request processing unit 56.

In the Up direction request issuing status management table 545, each time the Up direction request issuing unit 544 issues a TLP processing request to an Up direction request processing unit, a requester ID is registered, as a transaction ID, in an entry associated with the Up direction request processing unit being an issuing source.

Further, when receiving, from the Up direction request processing unit, a processing completion notification indicating that processing of the TLP is completed, the Up direction request issuing unit 544 deletes, from the Up direction request issuing status management table 545, a transaction ID and a request classification in an entry associated with the Up direction request processing unit that issues the processing completion notification.

The Up direction selecting unit 54 includes at least one input port. A TLP from an I/O device 7, the PCIe switch 6, or the like is input to each of the input ports. The TLP is basically a request (memory write request) of writing data in the memory 4, or a request (memory read request) of reading data from the memory 4.

The Up direction selecting unit 54 transfers, to a selected Up direction request processing unit, a TLP from the I/O device 7, the PCIe switch 6, or the like, as a processing request.

The Up direction memory write request processing unit 55 or the Up direction low load request processing unit 56 being an Up direction request processing unit analyzes a header of a TLP transferred from the Up direction selecting unit 54, and performs processing depending on a request classification.

For example, in a case of a memory write request, an Up direction request processing unit extracts information indicating that the request is writing in the memory 4, a payload portion of a TLP, and destination address information included in a header portion of the TLP; and transfers the extracted pieces of information to the Up direction output unit 57.

Further, in a case of a memory read request, an Up direction request processing unit extracts information indicating that the request is reading from the memory 4, a destination address included in a header portion of a TLP, and information on a data length designated by the header portion of the TLP; and transfers the extracted pieces of information to the Up direction output unit 57.

Processing in each of the Up direction memory write request processing units 55 enables to avoid a situation that processing relating to a specific one of the Up direction memory write request processing units 55 is continued to be performed by alternately performing processing by round-robin, for example. Note that, when a function of a PCIe route complex is implemented by means of a software, it is possible to avoid that processing is concentrated on a specific one of the Up direction memory write request processing units 55 by allocating a different CPU resource.

When processing with respect to a TLP is completed, an Up direction request processing unit notifies the Up direction selecting unit 54 of completion of the processing. The processing completion notification includes at least an identifier (request processing unit ID) of an Up direction request processing unit.

The Up direction output unit 57 transfers, to an appropriate module such as the memory controller 3, information included in a TLP transferred from an Up direction request processing unit.

The I/O device table 58 is a table in which an identifier of an I/O device 7 connected to a PCIe fabric, and load information indicating whether or not the I/O device 7 performs high-load data transfer in the PCIe fabric are registered.

Figure 7:
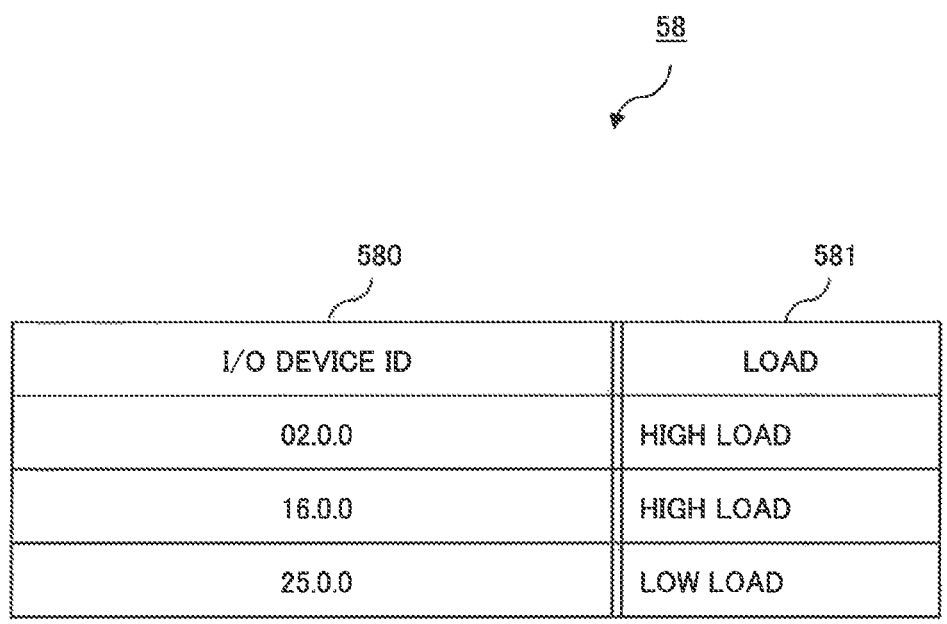
FIG. 7 is a table diagram illustrating a configuration example of an I/O device table.

FIG. 7 is a table diagram illustrating a configuration example of the I/O device table 58. Referring to FIG. 7, the I/O device table 58 is a table in which an entry having an I/O device ID (an I/O device ID 580 in FIG. 7) as a key, and load information (a load 581 in FIG. 7) indicating whether or not an I/O device 7 associated with the I/O device ID performs high-load data transfer as a value are registered.

The I/O device table setting interface 60 is an interface for registering an entry in the I/O device table 58 from the outside of the PCIe route complex 5.

The following is an example of a method of registering an entry by using the I/O device table setting interface 60. For example, when entry information is written by means of a software that runs on the computer 1 with respect to a specific address in a memory area allocated to the PCIe route complex 5, the entry information is registered in the I/O device table 58 through the I/O device table setting interface 60. Note that a software may be one of an operating system (OS) or an application.

[Description on Operation]

Next, an operation of a PCIe route complex in the present example embodiment is described with reference to a drawing.

First of all, an operation of registering an entry in the I/O device table 58 of the PCIe route complex 5 is described.

Figure 8:
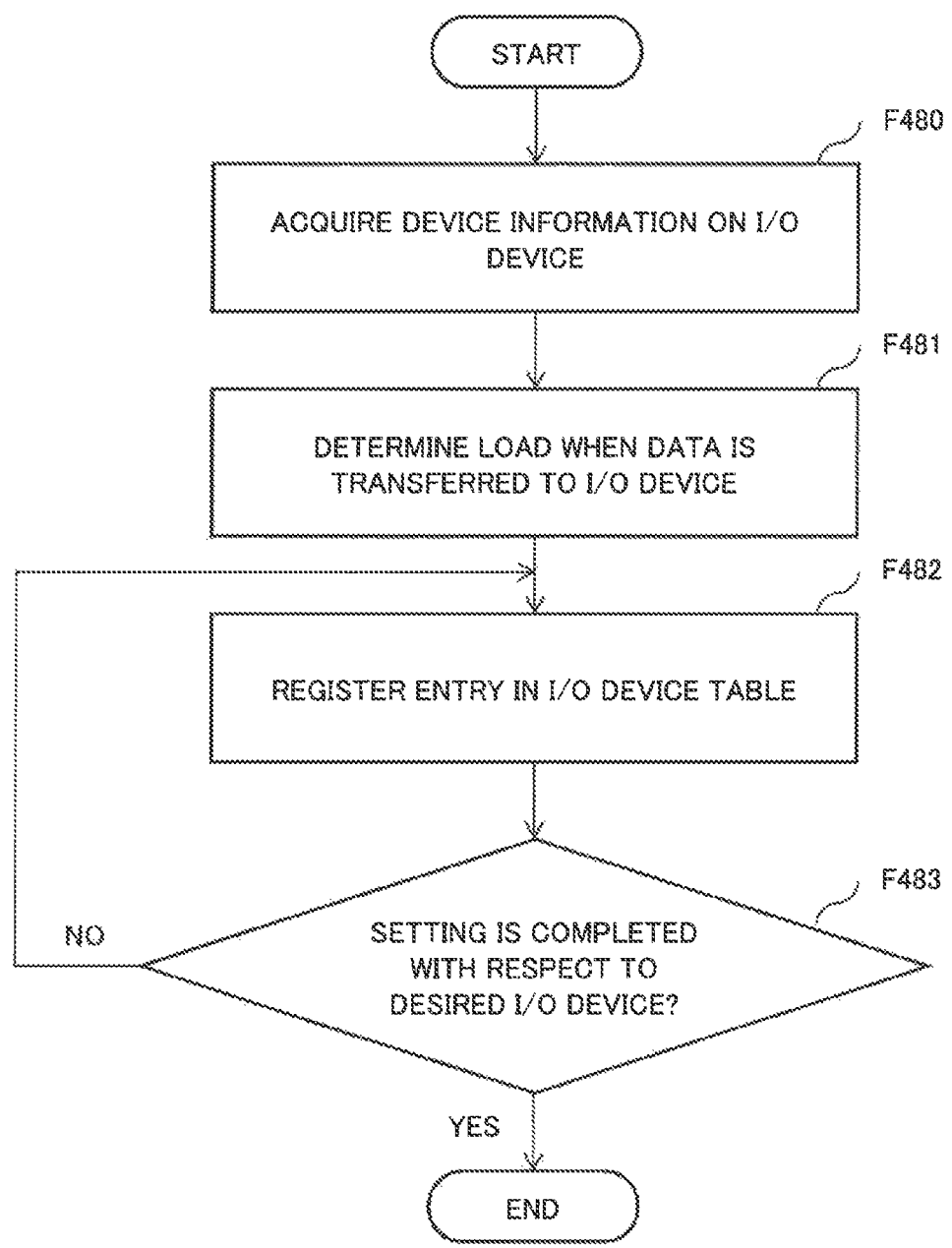
FIG. 8 is a flowchart illustrating an operation of adding an entry in the I/O device table.

FIG. 8 is a flowchart illustrating an operation of registering an entry in the I/O device table 58. The following is an example in which a software (an OS or an application) running on the computer 1 including the PCIe route complex 5 registers an entry in the I/O device table 58.

First of all, a software acquires device information of an I/O device 7 included in the computer 1 (Step F480 in FIG. 8). Device information includes at least an identifier (e.g., a BDF number) of an I/O device 7, a classification of the I/O device 7, and a data transfer rate of the I/O device 7. These pieces of device information are acquirable by using an output of an lspci command or a dmesg command, when an OS of the computer 1 is under a Linux (registered trademark) environment, and is an application running on the Linux.

Next, the software determines a load of data transfer of each of the I/O devices 7, based on device information acquired in Step F480 in FIG. 8 (Step F481 in FIG. 8). The determination is performed, based on a classification of an I/O device 7, and a transfer rate or a transfer frequency required for the I/O device. For example, when an I/O device 7 is an NIC or a GPU, since the NIC or the GPU is a device in which a transfer rate or a transfer frequency of data is high, the software determines that data transfer relating to the NIC or the GPU is a high load.

Next, the software registers, in the I/O device table 58, an ID of the I/O device 7, and load information based on data transfer and the like of the I/O device 7 determined in Step F481 in FIG. 8 (Step F482 in FIG. 8).

The software determines whether or not processing of Step F482 in FIG. 8 is performed with respect to a desired I/O device 7 (Step F483 in FIG. 8). The desired I/O device 7 may be a part or the entirety of I/O devices loaded in the computer 1.

When processing of Step F482 in FIG. 8 is not performed with respect to a desired I/O device 7 (No in Step F483 in FIG. 8), processing of Step F482 in FIG. 8 is performed with respect to an I/O device 7 for which these processing are not performed.

After these processing are performed with respect to a desired I/O device 7 (Step F483 in FIG. 8), the software completes registration of an entry in the I/O device table 58 (Yes in Step F483 in FIG. 8).

Note that an operation of registering an entry in the I/O device table 58 (Steps F481 to F483) may be omitted, when modification (addition or deletion) of an I/O device 7 to be connected to the PCIe route complex 5 is not present after registration of an entry.

Note that entry registration may be performed by means of a hardware such as a circuit, in addition to a software on the computer 1. Further, entry information in the I/O device table 58 may be acquired and registered from another equipment.

Next, an operation when the PCIe route complex 5 performs processing of a Down direction transmission processing request is described with reference to a drawing.

Figure 9:
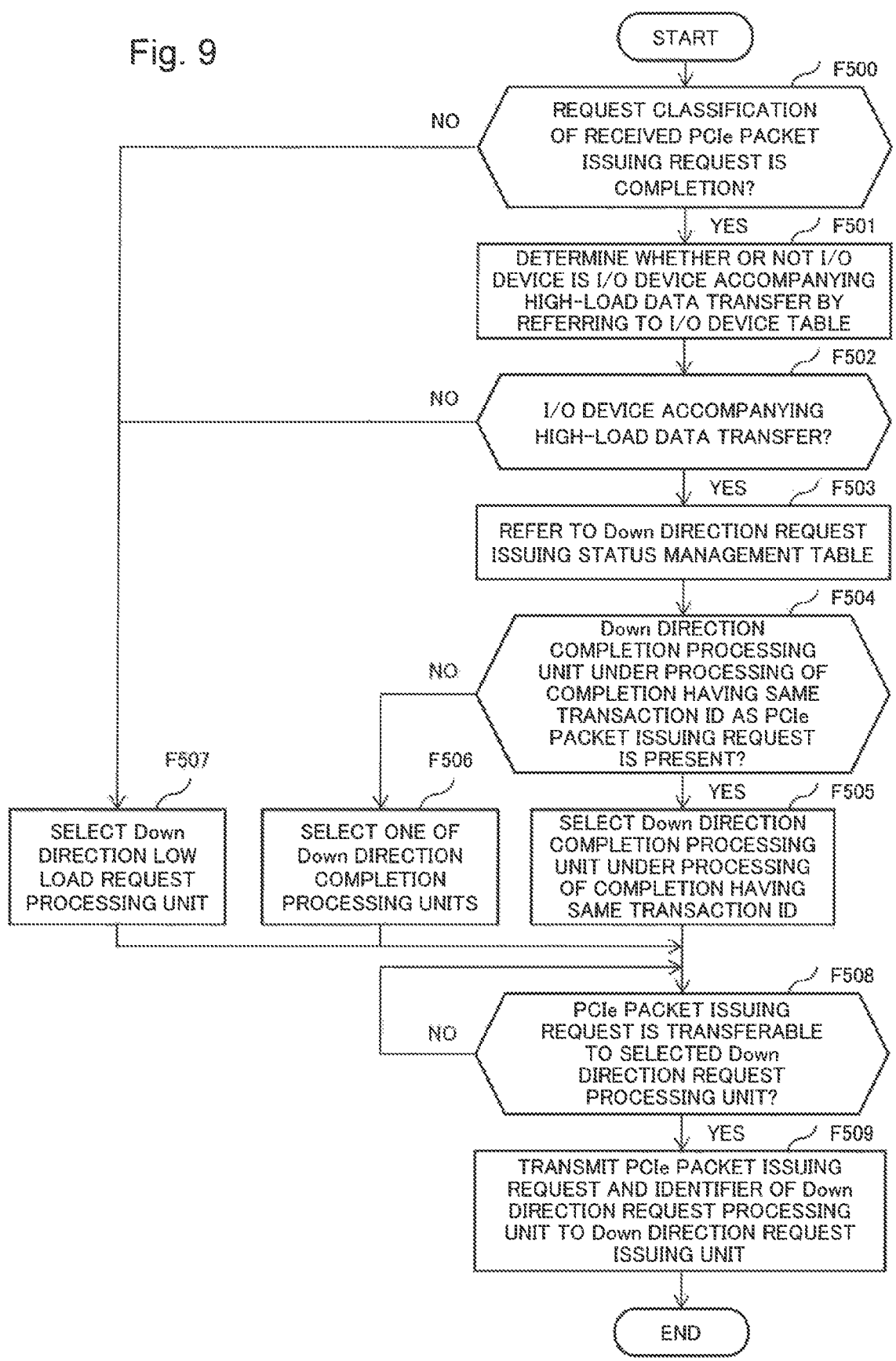
FIG. 9 is a flowchart illustrating an operation of a Down direction selecting unit, when a Down direction request processing unit is selected.

FIG. 9 is a flowchart illustrating an operation of selecting a Down direction request processing unit by the Down direction selecting unit 50.

When receiving a PCIe packet issuing request addressed to an I/O device 7 from the CPU 2 and the like, the Down direction selecting unit 50 selects a Down direction request processing unit that processes the request, based on a request classification of the PCIe packet issuing request, and referring to the I/O device table 58 and the Down direction request issuing status management table 505.

A PCIe packet issuing request includes at least a request classification of PCIe to be transmitted (e.g., a memory write request, a memory read request, a configuration read request, or a completion), an identifier of an I/O device 7 being a destination (e.g., a BDF number or a memory address), and a transfer data size. Further, a PCIe packet issuing request also includes information necessary and unique to a request, such as tag information required when transaction processing of a completion with respect to a memory read request is performed.

When a transaction classification is a completion (Yes in Step F500 in FIG. 9), the Down direction request determining unit 502 included in the Down direction selecting unit 50 determines whether or not an I/O device 7 being a transmission destination of a PCIe packet accompanies high-load data transfer by using an identifier of the I/O device 7, and referring to the I/O device table 58 (Step F501 in FIG. 9).

When an I/O device 7 being a transmission destination of a PCIe packet is an I/O device accompanying high-load data transfer (Yes in Step F502 in FIG. 9), the Down direction request determining unit 502 refers to the Down direction request issuing status management table 505 (Step F503 in FIG. 9).

When an entry in which a requester ID included in a PCIe packet transmission request and tag information coincide is present in the Down direction request issuing status management table 505 (Yes in Step F504 in FIG. 9), the determination result indicates that a completion having a same transaction ID is being processed by a Down direction completion processing unit 51. In this case, the Down direction request determining unit 502 selects a Down direction completion processing unit 51 under processing so that passing between completions does not occur (Step F505 in FIG. 9).

When an entry in which a requester ID included in a PCIe packet transmission request and tag information coincide is not present in the Down direction request issuing status management table 505 (No in Step F504 in FIG. 9), the down direction request determining unit 502 selects one of the Down direction completion processing units 51 (Step F506 in FIG. 9).

Note that, as a method of selecting a Down direction completion processing unit 51 in Step F506 in FIG. 9, for example, there is a method of preferentially selecting a Down direction completion processing unit 51 that does not process a request, a method of selecting a Down direction completion processing unit 51 in an order by round-robin, or a method of monitoring a load of each of the Down direction completion processing units 51, and selecting a Down direction completion processing unit 51 having a lowest load.

On the other hand, when a transaction classification of a PCIe packet issuing request received from the CPU 2 and the like is not a completion (No in Step F500 in FIG. 9), the Down direction request determining unit 502 selects the Down direction low load request processing unit 52 (Step F507 in FIG. 9).

Further, the Down direction request determining unit 502 determines whether or not a PCIe packet issuing request is transferrable to a Down direction request processing unit selected in Step F505, Step F506, or Step F507 in FIG. 9 (Step F508 in FIG. 9).

The expression "transferrable" indicates that a Down direction request processing unit selected in Step F505, Step F506, or Step S507 in FIG. 9 is in a state that no processing is performed in the Down direction request issuing status management table 505 (a state that the transaction ID 5051 and the request classification 5052 in FIG. 4 are "unallocated"). Further, when a PCIe packet issuing request to be transferred is a completion, this indicates a state that a posted request is not processed by the Down direction low load request processing unit 52.

Therefore, when a PCIe issuing request is not transferrable (No in Step F508 in FIG. 9), the Down direction request determining unit 502 determines whether or not a PCIe packet issuing request is re-transferrable after waiting for a certain time by referring to the Down direction request issuing status management table 505 (Step F508 in FIG. 9).

When a PCIe packet issuing request is transferable, the Down direction request determining unit 502 transmits, to the Down direction request issuing unit 504, a PCIe packet issuing request, and an identifier of a Down direction request processing unit that processes the request (Step F509 in FIG. 9).

The Down direction request issuing unit 504 transfers, to the designated Down direction request processing unit, the PCIe packet issuing request received from the Down direction request determining unit 502.

By the above-described processing, a PCIe packet issuing request is transferred to an appropriate Down direction request processing unit (a Down direction completion processing unit 51 or the Down direction low load request processing unit 52).

A reason why the Down direction request determining unit 502 determines whether or not a transaction classification is a completion at first in Step F500 in FIG. 9 is described.

A transaction classification when data actually read from the memory 4 are transferred to an I/O device 7 with respect to a memory read request from an I/O device 7 is a completion. A memory read request in this case is by DMA transfer. When an I/O device 7 is an NIC or a GPU, a large amount of data flow to a PCIe fabric by a completion packet. Therefore, for example, in order to determine whether or not a transaction classification is a high-load completion by data transfer, the Down direction request determining unit 502 is at first operated to determine whether or not a transaction classification is a completion. Note that in a case of a completion, a BDF number is used as an identifier of the I/O device 7 being a destination.

Further, in terms of a PCIe specification, it is not possible to transfer a large amount of data by one PCIe packet, regarding a completion with respect to a memory read request, or a PCIe packet other than a memory write request. Therefore, a large load is not exerted on a Down direction request processing unit regarding a PCIe packet other than the above.

Further, since performing a memory write request in a Down direction exerts a large load on the CPU 2, this is not generally performed. Further, there is a case that transferring a large amount of data by one TLP is restricted according to a specification of the CPU 2 and the like.

Therefore, the Down direction selecting unit 50 is operated in such a way as to select a Down direction low load processing unit with respect to a PCIe packet issuing request other than a completion.

A Down direction request processing unit configures a TLP from information included in a PCIe packet issuing request transferred from the Down direction selecting unit 50, and transfers the configured TLP to the Down direction output unit 53. A flag indicating an IDO may be set in the TLP.

A Down direction request processing unit transfers a configured TLP to the Down direction output unit 53, and notifies the Down direction selecting unit 50 of a processing completion notification. The processing completion notification includes at least an identifier of a Down direction request processing unit.

The Down direction request issuing unit 504 included in the Down direction selecting unit 50 receives a processing completion notification from a Down direction request processing unit, and deletes, from the Down direction request issuing status management table 505, a transaction ID and a request classification in an entry associated with an identifier of the Down direction request processing unit included in the processing completion notification.

The Down direction output unit 53 outputs, to an appropriate output port, the TLP transferred from the Down direction request processing unit in accordance with destination information.

By the above-described processing, a PCIe packet issuing request in a Down direction is processed by the PCIe route complex 5. Further, since a completion and a PCIe packet of a classification other than the above are processed by another Down direction request processing unit, even when a large amount of completions are generated by DMA transfer and the like, transmission of a PCIe packet of a classification other than a completion is not greatly delayed.

Further, when this configuration is employed, it is possible to follow an ordering rule of a PCIe packet in a Down direction. In the first example embodiment, packet passing of the following three patterns may occur.

(Pattern 1) A completion passes a completion.
(Pattern 2) A completion passes a PCIe packet other than a completion.
(Pattern 3) A PCIe packet other than a completion passes a completion.

First of all, regarding Pattern 1, passing is allowed between completions, as far as transaction IDs are different. However, when transaction IDs of two completions are the same, in processing of Step F504 in FIG. 9, the two completions are processed in an order by a same Down direction completion processing unit 51. Therefore, passing between completions does not occur.

Further, there is a possibility that passing occurs between a completion (high load) being processed by a Down direction completion processing unit 51, and a completion (low load) being processed by the Down direction low load request processing unit 52. However, a PCIe packet issuing request to be processed by the Down direction low load request processing unit 52 is an I/O device 7, which is set to be a "low load" in the I/O device table 58. Device identifiers are different between the I/O device 7, and an I/O device 7 for which a completion is processed by the Down direction low load request processing unit 52. Therefore, transaction IDs of these completions are always different from each other. Thus, even when passing occurs, it does not matter.

Next, regarding Pattern 2, a completion is possible to pass a non-posted request unconditionally in terms of a PCIe specification. Further, regarding a completion, <1> a completion in which an RO flag is set is possible to pass a posted request in terms of a PCIe specification. Further, when a completer ID of a completion and a requester ID of a posted request are different, regarding a completion, <2> a completion in which an IDO flag is set is possible to pass a posted request.

In the first example embodiment, since the PCIe route complex 5 is used as a target, both of a completer ID of a completion, and a requester ID of a posted request become an ID identifying the PCIe route complex 5. Therefore, in the PCIe route complex 5, basically, a completion cannot pass a posted request.

In the first example embodiment, when a PCIe packet issuing request is a completion in Step F508 in FIG. 9, the PCIe packet issuing request is transmitted to a Down direction request issuing unit after it is confirmed that a posted request is being processed by the Down direction low load request processing unit 52. Therefore, the completion cannot pass a posted request. In other words, a situation of Pattern 2 does not occur.

Next, regarding Pattern 3, a PCIe packet other than a completion is allowed to pass the completion in terms of a PCIe specification, and no special care is necessary.

Next, an operation when a TLP in an Up direction is processed by the PCIe route complex 5 is described with reference to a drawing.

Figure 10:
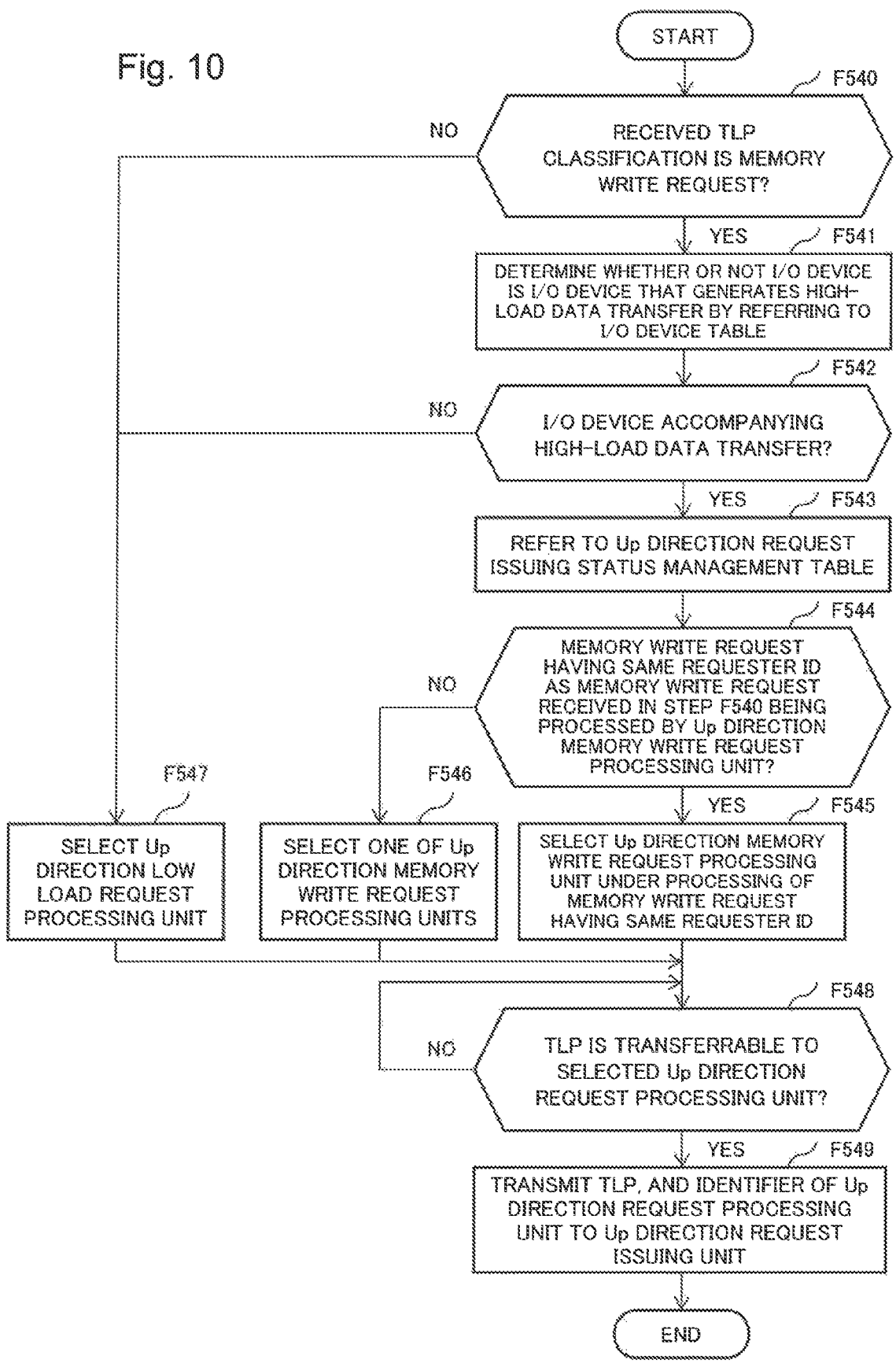
FIG. 10 is a flowchart illustrating an operation of the Up direction selecting unit, when an Up direction request processing unit is selected.

FIG. 10 is a flowchart illustrating an operation of selecting an Up direction request processing unit by the Up direction selecting unit 54.

When receiving a TLP from an I/O device 7 or the PCIe switch 6, the Up direction selecting unit 54 selects an Up direction request processing unit that processes the request, based on a classification of a TLP, and referring to the I/O device table 58 and the Up direction request issuing status management table 545.

When a classification of a TLP is a memory write request (posted request), the Up direction request determining unit 542 included in the Up direction selecting unit 54 determines whether or not an I/O device 7 being a transmission source of the TLP is an I/O device accompanying high-load data transfer by using a requester ID of the TLP, and referring to the I/O device table 58 (Step F541 in FIG. 10).

Next, when an I/O device 7 being a transmission source of a TLP is an I/O device accompanying high-load data transfer (Yes in Step F542 in FIG. 10), the Up direction request determining unit 542 refers to the Up direction request issuing status management table 545 (Step F543 in FIG. 10).

As a result of referring to the Up direction request issuing status management table 545, when a memory write request having a same requester ID as a TLP received in Step F540 in FIG. 10 is being processed by one of the Up direction memory write request processing units 55 (Yes in Step F544 in FIG. 10), the Up direction memory write request processing unit 55 is selected as an Up direction request processing unit that processes the TLP of the memory write request received in Step F540 in FIG. 10 (Step F545 in FIG. 10). Thus, passing between memory write requests having a same requester ID is prevented.

When a memory write request having a same requester ID is not processed by any of the Up direction memory write request processing units 55 (No in Step F544 in FIG. 10), one of the Up direction memory write request processing units 55 is selected (Step F546 in FIG. 10).

When a classification of a TLP received in Step F540 in FIG. 10 is not a memory write request (No in Step F540 in FIG. 10), the Up direction request determining unit 542 selects the Up direction low load request processing unit 56 (Step F547 in FIG. 10).

Next, the Up direction request determining unit 542 determines whether or not the TLP is transferrable to the Up direction request processing unit selected in Step F545, Step F546, or Step F547 in FIG. 10 (Step F548 in FIG. 10).

Herein, "transferrable" indicates that the following conditions are satisfied.

(Condition 1) An Up direction request processing unit selected in Step F545, Step F546, or Step F547 in FIG. 10 does not perform any processing in the Up direction request issuing status management table 545 (a state that the requester ID 5451 and a request classification 5452 in FIG. 6 are "unallocated").

(Condition 2) When an IDO flag is not set in the TLP received in Step F540 in FIG. 10, a posted request is not being processed by any of the Up direction request processing units.

(Condition 3) When an IDO flag is set in the TLP received in Step F540 in FIG. 10, a posted request having a same requester ID is not being processed by any of the Up direction request processing units.

Therefore, when the TLP is not transferrable (No in Step F548 in FIG. 10), the Up direction request determining unit 542 determines whether or not the TLP is re-transferrable after waiting for a certain time by referring to the Up direction request issuing status management table 545.

When the TLP is transferrable (Yes in Step F548 in FIG. 10), the Up direction request determining unit 542 transmits, to the Up direction request issuing unit 544, the TLP and an identifier of the Up direction request processing unit that processes the TLP (Step F549 in FIG. 10).

The Up direction request issuing unit 544 transfers, to the designated Up direction request processing unit, the TLP received from the Up direction request determining unit 542. By the above-described processing, a TLP is transferred to an appropriate Up direction request processing unit.

A memory write request from an I/O device 7 is by DMA transfer. When an I/O device 7 is an NIC or a GPU, a large amount of data flow to a PCIe fabric by a TLP of a memory write request. In Step F540 in FIG. 10, first of all, a reason why determination as to whether a TLP is a memory write request is performed first is to determine whether or not the TLP is a memory write request accompanying high-load data transfer.

Further, since a large amount of data are not transferrable by one PCIe packet in terms of a PCIe specification, regarding a completion with respect to a memory read request, or a PCIe packet other than a memory write request, in a PCIe packet other than the above, a large load is not exerted on an Up direction request processing unit. Therefore, the Up direction selecting unit 54 selects the Up direction low load request processing unit 56 with respect to a TLP other than a memory write request.

In this way, each of the Up direction request processing units extracts information from a TLP transferred from the Up direction selecting unit 54, and transfers the extracted information to the Up direction output unit 57. The Up direction output unit 57 transfers, to an appropriate module such as the memory controller 3, information included in a TLP packet transferred from an Up direction request processing unit.

By the above-described processing, a TLP in an Up direction is processed by the PCIe route complex 5.

An Up direction request processing unit transfers information included in a TLP to the Up direction output unit 57, and notifies the Up direction selecting unit 54 of a processing completion notification. A processing completion notification includes at least an identifier of an Up direction request processing unit.

The Up direction request issuing unit 544 included in the Up direction selecting unit 54 receives a processing completion notification from an Up direction request processing unit, and deletes, from the Up direction request issuing status management table 545, information on a transaction ID and a request classification in an entry associated with an identifier of the Up direction request processing unit included in the completion notification.

By the above-described processing, a TLP in an Up direction is processed by the PCIe route complex 5. Further, since a memory write request and a TLP of a classification other than the above are processed by another Up direction request processing unit, even when a large amount of memory write requests are generated by DMA transfer and the like, transmission of a TLP of a classification other than a memory write request is not greatly delayed.

Further, when this configuration is employed, it is possible to follow an ordering rule of a TLP in an Up direction.

In the first example embodiment, packet passing of the following three patterns may occur.

(Pattern 1) A TLP of a memory write request passes a TLP of a posted request.

(Pattern 2) A TLP of a memory write request passes a TLP other than a posted request.

(Pattern 3) A TLP other than a posted request passes a TLP of a posted request.

First of all, regarding Pattern 1, passing between posted requests is not allowed, when an RO flag or an IDO flag is not set in terms of a PCIe specification (a memory write request is a classification of a posted request). In the first example embodiment, since a posted request in which an IDO flag is not set waits until there is no Up direction request processing unit that processes a posted request in Step F548 in FIG. 10, passing between posted requests does not occur.

Further, when an IDO flag is set, although passing between posted requests is enabled, a condition that requester IDs are different from each other is required. In the first example embodiment, when an IDO flag is set, since a request waits until there is no Up direction request processing unit under processing of a posted request having a same requester ID in Step F548 in FIG. 10, passing that becomes a problem does not occur.

Next, regarding Pattern 2, since a posted request is possible to pass a TLP other than a posted request in terms of a PCIe specification, passing of Pattern 2 does not matter.

Next, regarding Pattern 3, in the first example embodiment, a TLP other than a posted request is processed by the Up direction low load request processing unit 56. When an IDO flag is not set, a TLP other than a posted request is not allowed to pass a posted request in terms of a PCIe specification. Further, even when an IDO flag is set, only after it is confirmed in Step F549 in FIG. 10 that a posted request having a same requester ID (in the first example embodiment, only a memory write request is a target) is not processed by an Up direction memory write request processing unit 55, the TLP is transferred to the Up direction request processing unit. Therefore, passing that becomes a problem does not occur. In an example of the first example embodiment, since there is only one Up direction low load request processing unit 56, there is no likelihood that a TLP other than a posted request in the Up direction low load request processing unit 56 passes a TLP of a posted request.

Modification Example of First Example Embodiment

Note that it is possible to provide an I/O device table 58 for each direction of transaction, namely, an Up direction I/O device table and a Down direction I/O device table are provided.

For example, when data are displayed on a display by a GPU, although data transfer in a Down direction frequently occurs, data transfer in an Up direction seldom occurs. This is because data to be transferred from a PCIe route complex 5 to a GPU are adapted to be displayed on a display, and it is less likely that the data are acquired from the GPU, and an I/O device 7 other than the GPU uses the data for some processing. This means that there is a difference in data transfer amount or data transfer frequency between an Up direction and a Down distraction.

Figure 11:
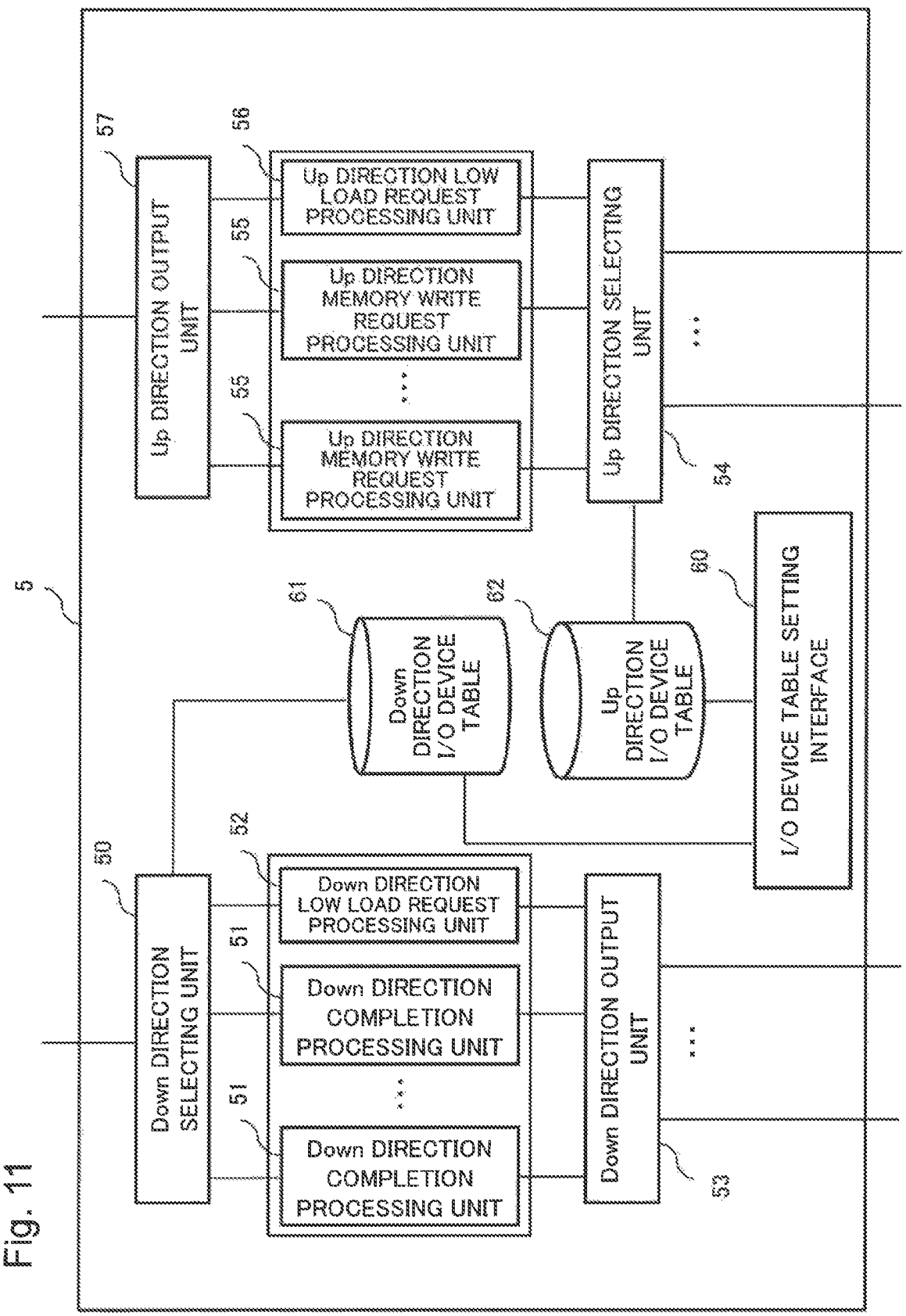
FIG. 11 is a block diagram illustrating a configuration of a modification example of the first example embodiment.

FIG. 11 is a block diagram illustrating a configuration of a modification example of the first example embodiment. The modification example of the first example embodiment illustrated in FIG. 11 includes an I/O device table in each of an Up direction and a Down direction.

In a case of an I/O device 7 such as a GPU in which data transfer in an Up direction seldom occurs, and data transfer in a Down direction frequently occurs, a device ID of the GPU, and information indicating that the GPU is a high load are registered as an entry in a Down direction I/O device table 61. Further, the device ID of the GPU, and information indicating that the GPU is a low load are registered as an entry in an Up direction I/O device table 62. By configuring as described above, appropriate selection is enabled by each of an Up direction request processing unit and a Down direction request processing unit with respect to an I/O device having a difference in data transfer amount or data transfer frequency between an Up direction and a Down direction.

A method of registering an entry in the Down direction I/O device table 61 and the Up direction I/O device table 62 is executable similarly to the method of registering an entry in an I/O device table illustrated in FIG. 8.

Note that, in an example of the first example embodiment, a configuration of dividing a processing unit into two processing units, namely, a processing unit for processing a high-load request, and a processing unit for processing a low-load request, is employed in each of an Up direction request processing unit and a Down direction request processing unit. The example embodiment of the present invention, however, is not limited to the above. For example, a load may be further divided, and processing units associated with a larger number of load levels may be provided in each of an Up direction and a Down direction. More specifically, when processing units of four stages, namely, a low load, a first intermediate load, a second intermediate load, and a high load are provided in each of an Up direction and a Down direction, in a case of an NIC, a configuration may be employed in such a way that, the processing units are classified depending on a transfer rate, such as 100 Mbps or less, 1 Gbps, 2.5 Gbps, and 10 Gbps or more, and the loads are processed by processing units (a low load, a first intermediate load, a second intermediate load, and a high load), which are associated with respectively different load levels.

Description on Advantageous Effects

In the first example embodiment, a request processing unit is divided into a processing unit for processing a high-load request, and a processing unit for processing a low-load request; and a request processing unit is selected depending on an identifier of an I/O device 7 being a transfer destination or a transfer source, and a PCIe packet issuing request or a classification of a TLP.

An entry is registered in a table for use in this selection, based on a classification of an I/O device 7, and a data transfer rate required for the I/O device 7. Further, taking into consideration an ordering rule determined according to a PCIe specification, an operation is performed in such a way as to wait for issuance of a next processing request depending on a PCIe packet issuing request that is already processed by a request processing unit or a classification of a TLP.

Thus, processing is performed by a processing unit for processing a high-load request with respect to an I/O device 7 accompanying high-load data transfer such as an NIC, while following an ordering rule determined according to a PCIe specification, and processing is performed by a processing unit for processing a low-load request with respect to an I/O device 7 that performs low-load data transfer such as an RS-232c device. Thus, it is possible to prevent a situation that processing of an I/O device 7 that performs high-load data transfer impedes processing of an I/O device 7 that performs low-load data transfer.

Second Example Embodiment

Next, a second example embodiment according to the present invention is described in detail with reference to the drawings. Note that, in the second example embodiment, constituent elements similar to those in the first example embodiment are indicated with same reference signs, and detailed description thereof is omitted.

Description on Configuration

Figure 12:
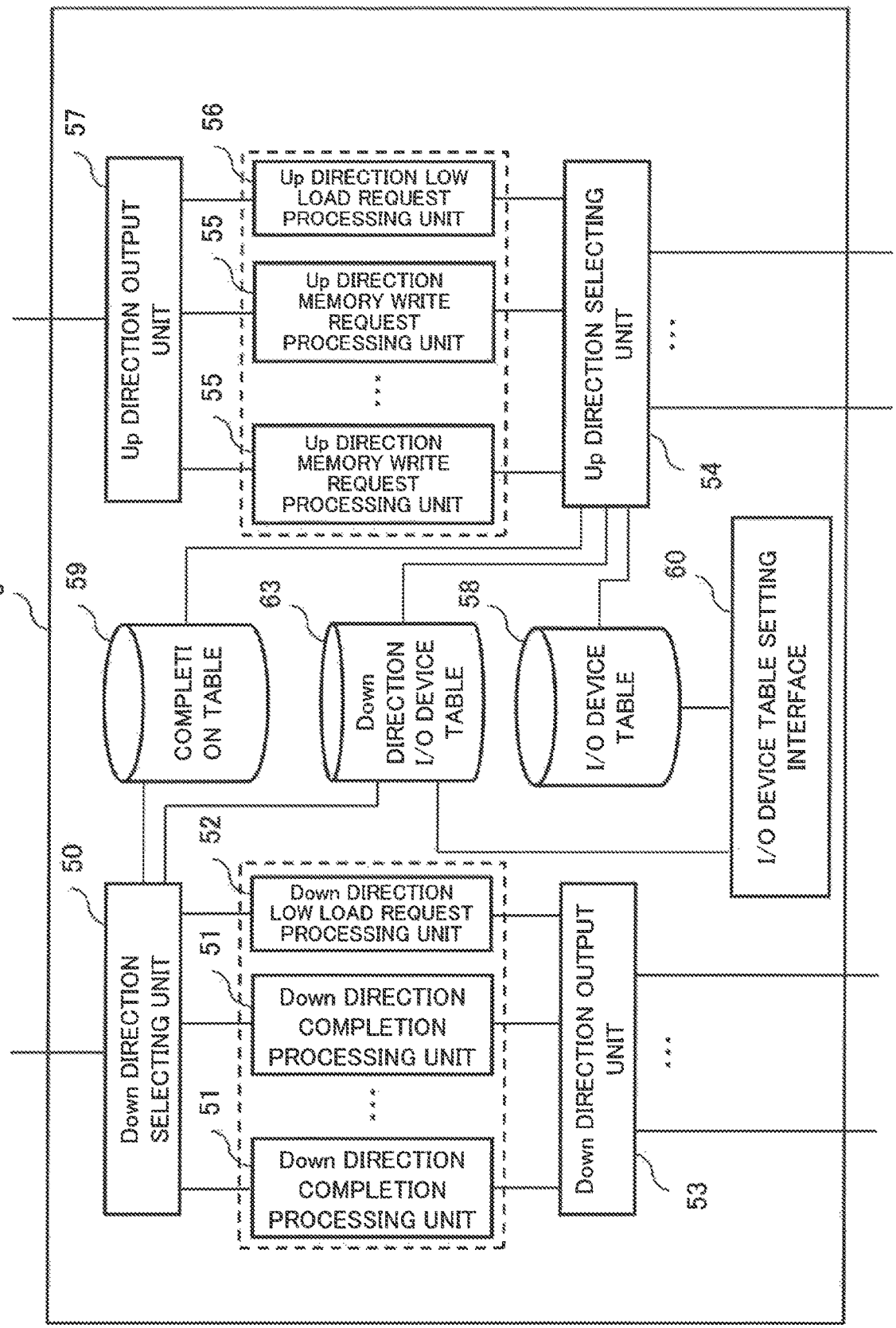
FIG. 12 is a block diagram illustrating a configuration of a PCIe route complex according to a second example embodiment.

FIG. 12 is a block diagram illustrating a configuration of a PCIe route complex 5 according to the second example embodiment of the present invention. Referring to FIG. 12, the PCIe route complex 5 according to the second example embodiment is different from the configuration of the first example embodiment illustrated in FIG. 2 in a point that the PCIe route complex 5 further includes a completion table 59 and a Down direction I/O device table 63.

In the PCIe route complex 5 according to the second example embodiment, the completion table 59 and the Down direction I/O device table 63 are connected to a Down direction selecting unit 50 and an Up direction selecting unit 54. The Down direction selecting unit 50 is not connected to an I/O device table 58.

Information on a completion generated with respect to a memory read request from an I/O device 7 is registered in the completion table 59.

FIG. 13 is a table diagram illustrating a configuration of the completion table 59. Referring to FIG. 13, the completion table 59 has a table structure such that a transaction ID (a transaction ID 590 in FIG. 13) is acquired as a key, and a remaining transfer size to be transferred by a TLP of a completion (a remaining transfer size 591 in FIG. 13) and a Down direction request processing unit (a processing unit load 592 in FIG. 13) that processes the TLP of the completion are acquired as values.

As illustrated in FIG. 13, the transaction ID 590 is configured by combining a requester ID included in a TLP of a completion, and a tag.

An entry in the completion table 59 is registered by the Up direction selecting unit 54, based on information included in a TLP of a memory read request, when the Up direction selecting unit 54 receives the TLP of the memory read request from an I/O device 7.

FIG. 14 is a table diagram illustrating a configuration example of the Down direction I/O device table 63 according to the second example embodiment. Referring to FIG. 14, the Down direction I/O device table 63 is a table in which an entry having an ID of an I/O device 7 (an I/O device ID 630 in FIG. 14) as a key, and a threshold value (a threshold 631 in FIG. 14) as a value is registered. The threshold value becomes a reference value indicating at what byte or more in terms of a read size of a memory read request issued by the I/O device 7, the Down direction selecting unit 50 selects a Down direction completion processing unit 51.

When an entry is registered in the Down direction I/O device table 63, it becomes possible to control a selection destination of a Down direction request processing unit by the Down direction selecting unit 50 by changing setting on a threshold value. For example, by setting a threshold value to zero, the Down direction selecting unit 50 is enabled to always select a Down direction completion processing unit 51 with respect to a specific I/O device 7.

Further, by setting a predefined value as a threshold value, the Down direction selecting unit 50 is enabled to select a Down direction low load request processing unit 52 with respect to a specific I/O device 7. As an example of the predefined value, using a maximum value of a threshold value registerable in the Down direction I/O device table 63 is proposed. For example, as far as a threshold value is a non-negative integer value of 32 bits width, a value corresponding to 0xFFFFFFFF by hexadecimal digits is set.

The Down direction I/O device table 63 is set according to a procedure similar to FIG. 8 through an I/O device table setting interface 60.

Description on Operation

Next, an operation of a PCIe route complex according to the second example embodiment is described with reference to a drawing.

Figure 15:
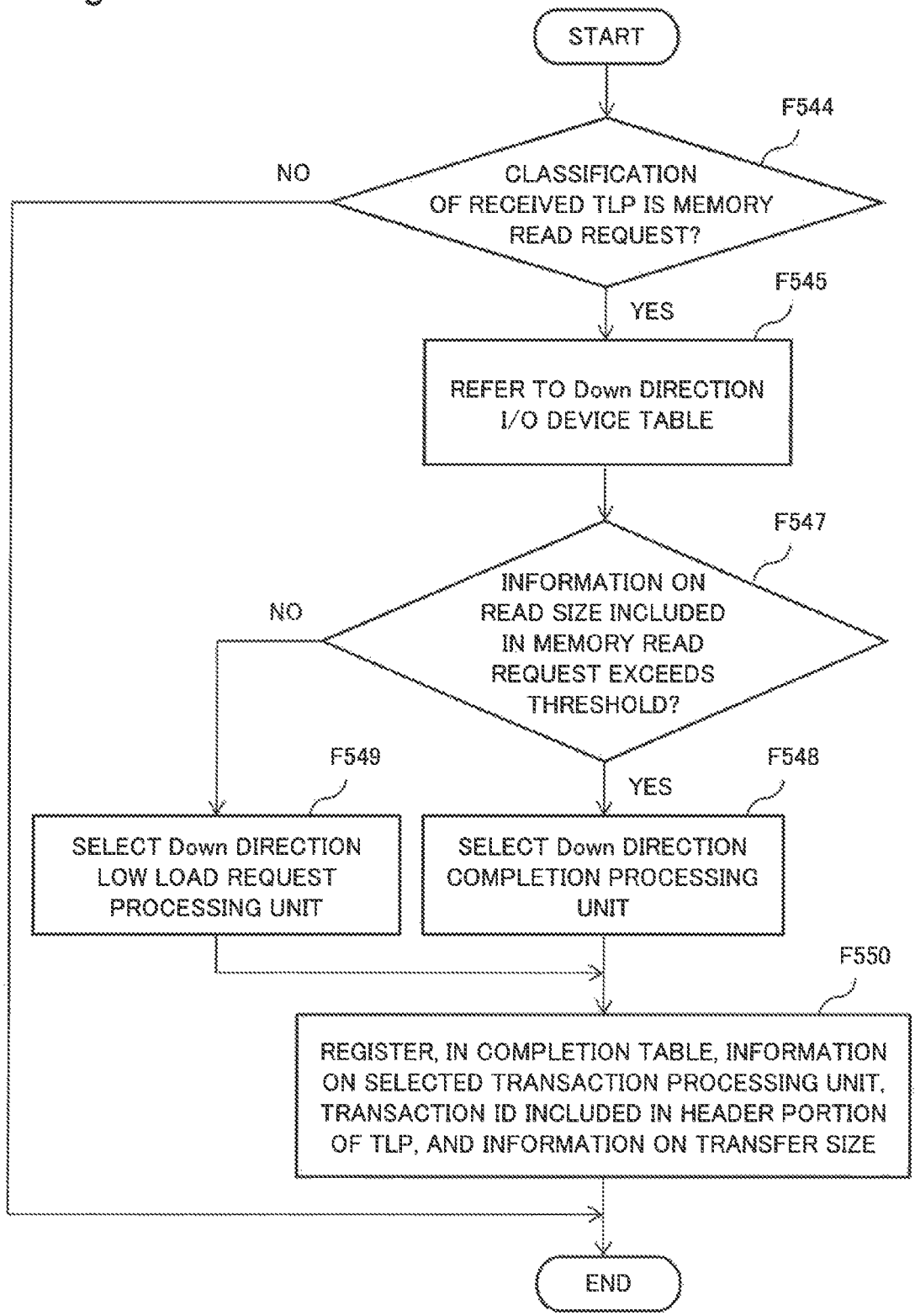
FIG. 15 is a flowchart illustrating an operation, when an Up direction selecting unit adds an entry in a completion table.

FIG. 15 is a flowchart illustrating an operation when the Up direction selecting unit 54 of the PCIe route complex 5 adds an entry in the completion table 59.

First of all, when an Up direction request determining unit 542 included in the Up direction selecting unit 54 receives a TLP of a memory read request (Yes in Step F544 in FIG. 15), the Up direction selecting unit 54 refers to the Down direction I/O device table 63 by using a requester ID of the received TLP as a key (Step F545 in FIG. 15).

Comparison is made between information on a read size included in a memory read request, and a threshold value of an associated entry in the Down direction I/O device table 63 (Step F547 in FIG. 15). When the read size is lager than the threshold value (Yes in Step F547 in FIG. 15), the Down direction completion processing unit 51 is selected (Step F548 in FIG. 15). When the read size is not larger than the threshold value (No in Step F547 in FIG. 15), the Down direction low load request processing unit 52 is selected (Step F549 in FIG. 15).

Next, the Up direction selecting unit 54 registers, in the completion table 59, information acquired in Step F548 or Step F549 in FIG. 15 and relating to by which one of the Down direction request processing units, processing is performed, a transaction ID (a pair of a requester ID and a tag) included in a header portion of a received TLP, and information included in the header portion of the TLP and relating to a transfer size (Step F550 in FIG. 15).

When the received TLP is a request other than a memory read request (No in Step F544 in FIG. 15), the Up direction selecting unit 54 finishes the processing of FIG. 15, without adding an entry in the completion table 59.

By the above-described processing, an entry is added in the completion table 59.

Note that, since the processing of FIG. 10 and the processing of FIG. 15 are independent of each other, it does not matter which one of the processing is performed first by the Up direction request determining unit 542.

Next, a way how the Down direction selecting unit 50 selects a Down direction request processing unit, when receiving a PCIe packet issuing request, is described with reference to a drawing.

Figure 16:
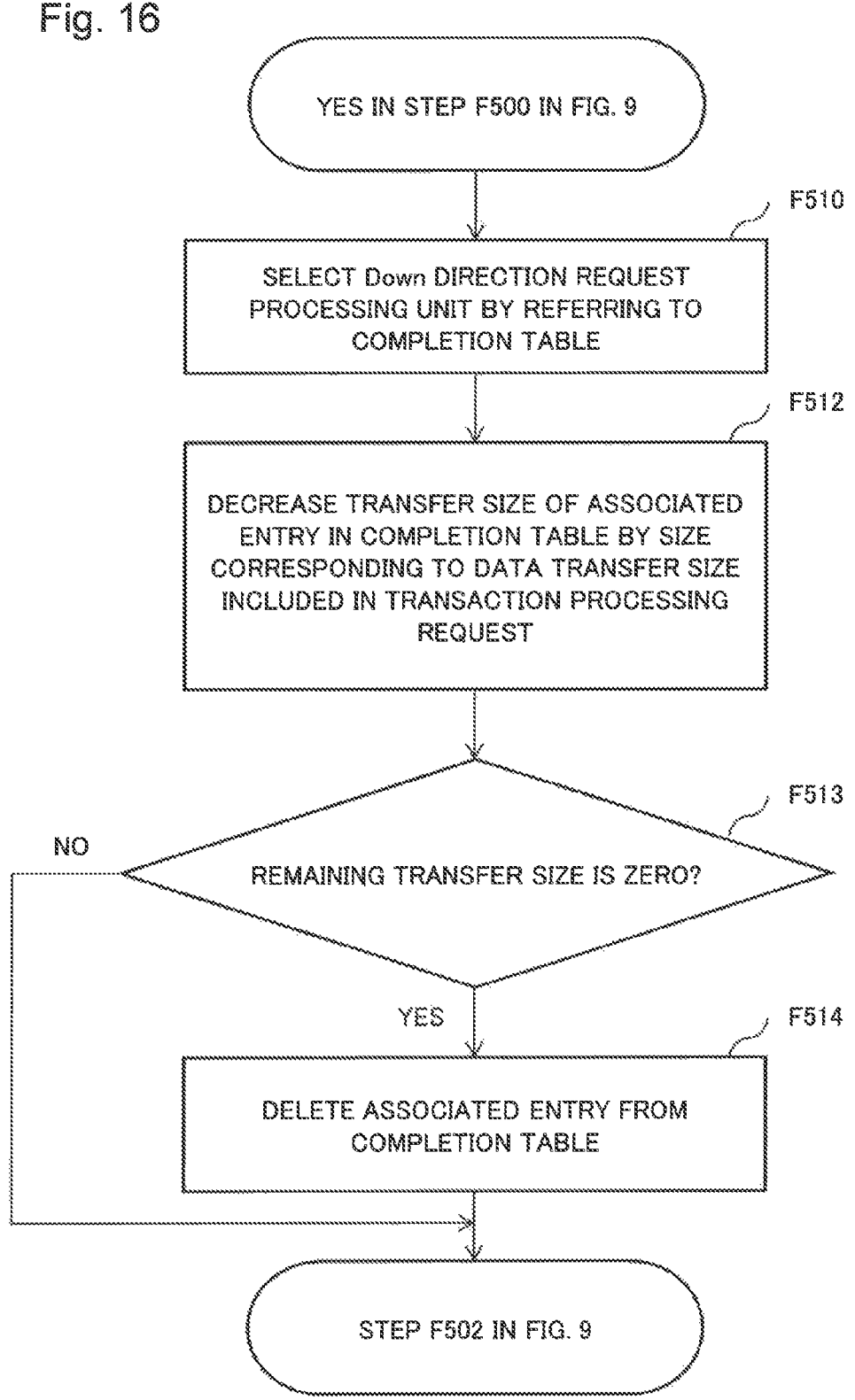
FIG. 16 is a flowchart illustrating an operation of selecting a Down direction request processing unit by a Down direction selecting unit.

FIG. 16 is a flowchart illustrating an operation of selecting a Down direction request processing unit by the Down direction selecting unit 50. Specifically, FIG. 16 illustrates processing of selecting a Down direction request processing unit by using the completion table 59, when the Down direction selecting unit 50 receives a PCIe packet issuing request. The flowchart of FIG. 16 is inserted between Step F500 in FIG. 9, and Step F502 in FIG. 9. Therefore, description about common portions to FIG. 9 is omitted.

When the Down direction selecting unit 50 receives a transaction processing request of a completion (Yes in Step F500 in FIG. 9), the Down direction selecting unit 50 selects a Down direction request processing unit by using a transaction ID and referring to the completion table 59 (Step F510 in FIG. 16).

Next, the Down direction selecting unit 50 decreases a value of a transfer size of an associated entry in the completion table 59 by a size corresponding to a data transfer size included in a transaction processing request (Step F512 in FIG. 16).

Next, when the remaining transfer size of the associated entry becomes zero (Yes in Step F513 in FIG. 16), the Down direction selecting unit 50 deletes the associated entry from the completion table 59 (Step F514 in FIG. 16).

When the remaining transfer size of the associated entry is not zero (No in Step F513 in FIG. 16), the Down direction selecting unit 50 does not perform processing of deleting the entry.

By the above-described processing, the Down direction selecting unit 50 selects a Down direction request processing unit by using the completion table 59.

Note that, as described in the second example embodiment, when there are two classifications of a Down direction request processing unit, namely, a completion and a low load, only information on a completion that uses a Down direction completion processing unit 51 may be registered in the completion table 59. In this case, a completion processing request for an entry that is not present in the completion table 59 is processed by the Down direction low load request processing unit 52.

In other words, before Step F510 in FIG. 16, a step of determining whether or not an entry is present in the completion table 59 is inserted. When a determination result is No (an entry is not present in the completion table 59), Step F507 in FIG. 9 is performed next.

In this case, an item of a processing unit (the processing unit load 592 in FIG. 13) is unnecessary in the completion table 59.

Also, in the above-described configuration, it is possible to follow the following ordering rule of a PCIe packet in a Down direction. In an example of the second example embodiment, packet passing of the following three patterns may occur.

(Pattern 1) A completion passes a completion.

(Pattern 2) A completion passes a PCIe packet other than a completion.

(Pattern 3) A PCIe packet other than a completion passes a completion.

A pattern that is affected in the second example embodiment is Pattern 1. In other words, even when completions are addressed to a same I/O device 7, the completions may be processed by both of a Down direction completion processing unit 51 and the Down direction low load request processing unit 52.

However, since a completion table identifies a completion by a transaction ID, completions having a same transaction ID are processed by a same Down direction request processing unit. Therefore, passing between completions having a same transaction ID does not occur.

Generally, when an I/O device 7 issues a memory read request, the request is issued by changing (tag information of) a transaction ID between requests. Therefore, regarding the I/O device 7, transaction IDs of a completion to be processed by the Down direction low load request processing unit 52, and a completion to be processed by a Down direction completion processing unit 51 are different from each other.

By the above-described processing, passing that becomes a problem does not occur even in the case of (1).

Description on Advantageous Effects

Next, advantageous effects of the second example embodiment are described.

In the second example embodiment, when receiving a TLP of a memory read request, the Up direction selecting unit 54 registers, in the completion table 59, information on a Down direction request processing unit selected in accordance with a data size to be read by a memory read request, and information on a completion that is generated as a response to the memory read request.

Thus, even an I/O device 7 accompanying high-load data transfer is possible to select the Down direction low load request processing unit 52, as far as a data size is small. Thus, it becomes possible to more finely select a Down direction request processing unit.

(Others)

There is a virtualization technique of implementing a function equivalent to the PCIe route complex 5 of PCI Express as a program that runs on the computer 1.

The technique is a method in which a server virtualization environment is used as a target, a virtual machine monitor (VMM) traps an access to an I/O device from a virtual machine (VM) that runs on the VMM, a PCIe packet is generated, and the PCIe packet is transmitted to an I/O device connected on a general-purpose network through an NIC.

Heretofore, a method of implementing a PCIe device that is implemented as a hardware by means of a software is available. Consequently, data transfer of an I/O device 7 that performs data transfer at a low data rate may be impeded by data transfer of an I/O device 7 that requires a high data rate.

In the above-described NIC or GPU, data transfer is performed with respect to the memory 4 at a high data transfer rate. However, in an interface for serial communication, communication is performed only at a rate of 1/1000 or less of a data transfer rate required for an NIC or a GPU, such as 64 Kbps.

When an NIC or a GPU ceaselessly performs data transfer with respect to the memory 4 by a DMA, data transfer of an interface for serial communication is impeded, and serial communication through the interface may be disabled.

In a case of a PCIe device implemented by means of a hardware, since it is possible to connect between PCIe devices at a data rate equal to or higher than a data rate required for an I/O device 7 that performs data transfer at a high rate such as an NIC, the above-described problem does not occur.

On the other hand, when transfer processing of a PCIe packet is performed by implementing a PCIe device by means of a software, performance as high as that of a PCIe device that is implemented by means of a hardware cannot be attained.

According to the first and second example embodiments, it is possible to prevent that a specific I/O device occupies a resource of a PCIe route complex in a computer in which a PCIe route complex is implemented by means of a software.

Note that it is possible to implement a configuration of the present invention with use of a PCIe component configured by means of a software or a hardware.

The example embodiment of the present invention is applicable not only to the PCIe route complex 5 according to the above-described first and second example embodiments, but also to the PCIe switch 6. In this case, a Down direction selecting unit does not receive a PCIe packet issuing request but receives a TLP, and a Down direction request processing unit does not configure a TLP but performs transfer processing of a TLP.

Third Example Embodiment

A packet processing device 20 according to a third example embodiment is a device equivalent to a configuration of the PCIe route complex 5 according to the first example embodiment. In the following, in description on a packet processing device according to the third example embodiment, configurations similar to those of the PCIe route complex 5 and the computer 1 according to the first example embodiment are indicated with same reference signs, and detailed description thereof is omitted.

Figure 17:
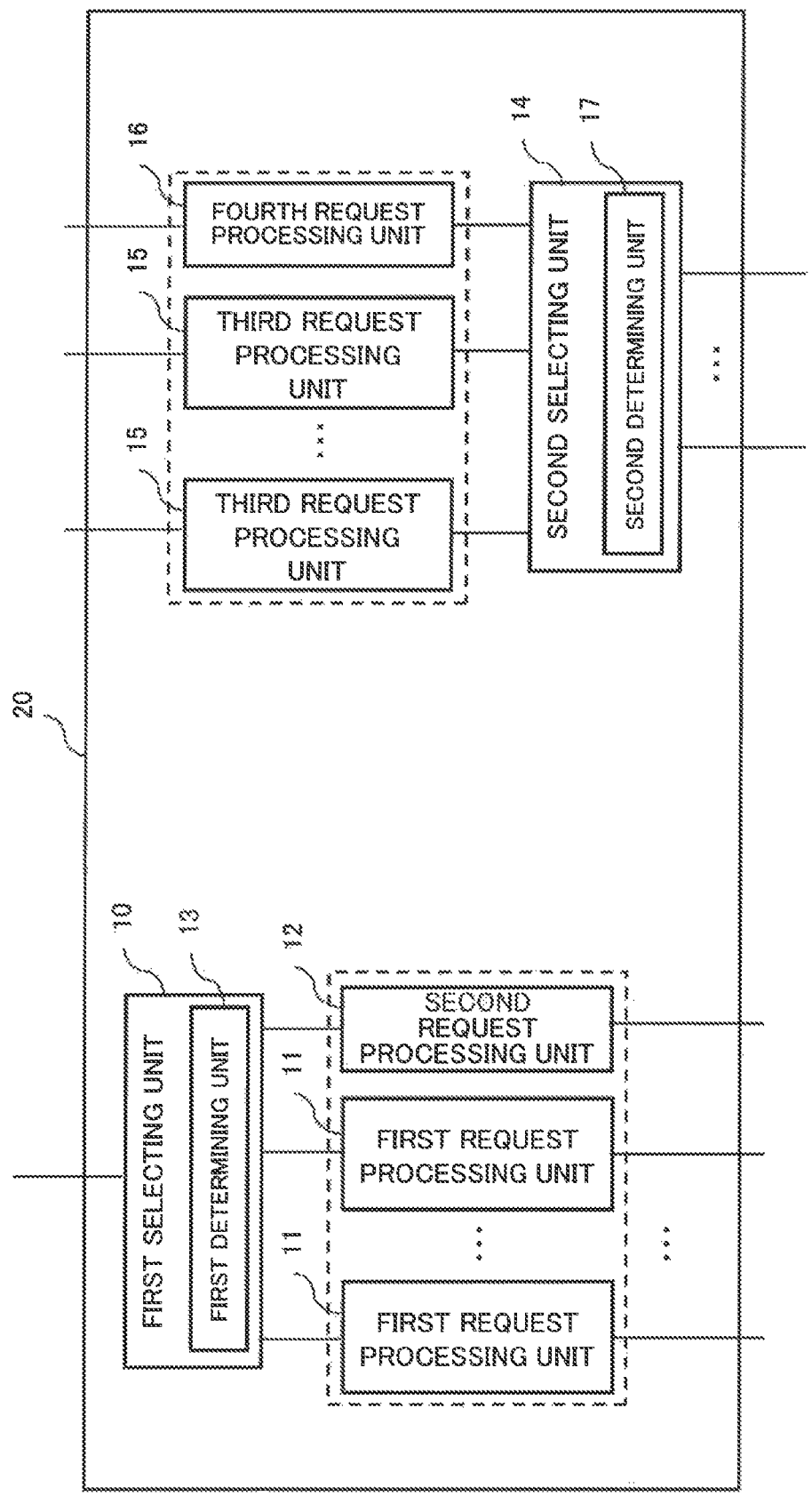
FIG. 17 is a block diagram illustrating a configuration of a packet processing device according to a third example embodiment.

FIG. 17 is a block diagram illustrating a configuration of a packet processing device 20 according to the third example embodiment. Referring to FIG. 1 and FIG. 17, similarly to the PCIe route complex 5, the packet processing device 20 is connected as a route of a plurality of I/O devices 7, and configures a PCIe fabric.

The packet processing device 20 includes a first selecting unit 10, a plurality of first request processing units 11, a second request processing unit 12, a first determining unit 13, a second selecting unit 14, a plurality of third request processing units 15, a fourth request processing unit 16, and a second determining unit 17.

(Down Direction: Direction from Packet Processing Device 20 to I/O Device 7)

The plurality of the first request processing units 11 and the second request processing unit 12 process a PCIe packet issuing request to an I/O device 7. The first selecting unit 10 selects the plurality of the first request processing units 11 or the second request processing unit 12, based on a request classification of a PCIe packet issuing request, and a load exerted on a PCIe fabric by a packet to be transmitted to the I/O device. The first determining unit 13 of the first selecting unit 10 determines whether or not the PCIe packet issuing request is possible to pass another PCIe packet issuing request being processed by the first request processing unit, based on a transaction identifier included in a packet processing request.

When there is a first request processing unit 11 under processing of another PCIe packet issuing request having a same transaction identifier as a transaction identifier included in a PCIe packet issuing request, the first determining unit 13 selects the first request processing unit under processing. On the other hand, when there is no first request processing unit 11 under processing, the first determining unit 13 selects one of the plurality of the first request processing units 11.

Further, when a request classification of a PCIe packet issuing request is a classification other than a completion, the first determining unit 13 selects the second request processing unit 12.

(Up Direction: Direction from I/O Device 7 to Packet Processing Device 20)

The plurality of the third request processing units 15 and the fourth request processing unit 16 of the packet processing device 20 process a transaction packet from an I/O device 7.

The second selecting unit 14 selects the plurality of the third request processing units 15 or the fourth request processing unit 16, based on a classification of a transaction packet, and a load exerted on a PCIe fabric by a transaction packet from the I/O device 7. When a classification of a transaction packet is a memory write request, the second determining unit 17 of the second selecting unit 14 determines whether or not the memory write request is possible to pass another memory write request being processed by the third request processing unit 15, based on a requester identifier included in the memory write request.

When there is a third request processing unit 15 under processing of another memory write request having a same requester identifier as a requester identifier included in a memory write request, the second determining unit 17 selects the third request processing unit under processing. On the other hand, when there is no third request processing unit under processing, the second determining unit 17 selects one of the plurality of the third request processing units 15.

When a classification of a transaction packet is a classification other than a memory write request, the second determining unit 17 selects the fourth request processing unit 16.

In a packet processing device according to the third example embodiment, it is possible to prevent processing of a request by a certain I/O device from impeding processing of a request by another I/O device. A reason for this is that the first determining unit 13 is possible to determine whether or not a PCIe packet issuing request is possible to pass another PCIe packet issuing request being processed by the first request processing unit, based on a transaction identifier included in the PCIe packet issuing request. Further, when a classification of transaction packet is a memory write request, the second determining unit 17 of the second selecting unit 14 determines whether or not the memory write request is possible to pass another memory write request being processed by the third request processing unit 15, based on a requester identifier included in the memory write request.

A part or the entirety of each constituent element such as a packet processing device or a PCIe route complex according to the above-described first to third example embodiments is implemented by another general-purpose or dedicated circuit, processor, and the like, and combination of these elements. These elements may be constituted of a single chip, or may be constituted of a plurality of chips to be connected via a bus. Further, a programmable logic device such as a field-programmable gate array (FPGA) may be employed.

Further, a part or the entirety of each constituent element of a packet processing device may be implemented by combining the above-described circuit and the like, and a program.

Note that, when a part or the entirety of each constituent element of a packet processing device is implemented by a plurality of information processing devices, circuits, or the like, the plurality of information processing devices, the circuits, or the like may be concentratedly disposed or distributively disposed.

In the foregoing, the invention of the present application is described with reference to example embodiments. The invention of the present application, however, is not limited to the above-described example embodiments. A configuration and details of the invention of the present application may be modified in various ways comprehensible to a person skilled in the art within the scope of the invention of the present application.

This application is based upon and claims the benefit of priority based on Japanese patent application No. 2016-127411 filed on Jun. 28, 2016, the disclosure of which is incorporated herein in its entirety by reference.

REFERENCE SIGNS LIST 1, 1A Computer
2 Central Processing Unit (CPU)
3 Memory controller
4 Memory
5, 5A PCI Express route complex
6 PCI Express switch
7 I/O device
50 Down direction selecting unit
51 Down direction completion processing unit
52 Down direction low load request processing unit
53 Down direction output unit
54 Up direction selecting unit
55 Up direction memory write request processing unit
56 Up direction low load request processing unit
57 Up direction output unit
58 I/O device table
59, 66 Completion table
60 I/O device table setting interface
61, 63 Down direction I/O device table
62 Up direction I/O device table
502 Down direction request determining unit
503 Down direction external table referring unit
504 Down direction request issuing unit
505 Down direction request issuing status management table
542 Up direction request determining unit
543 Up direction external table referring unit
544 Up direction request issuing unit
545 Up direction request issuing status management table

What is claimed is:

1. A packet processing device being connected as a route of a plurality of I/O devices and configuring a PCIe (registered trademark) fabric, the packet processing device comprising:
   a plurality of first request processing units and a second request processing unit that process a PCIe packet issuing request to the I/O device; and
   a first selecting unit that selects the plurality of first request processing units or the second request processing unit, based on a request classification of the PCIe packet issuing request, and a load exerted on the PCIe fabric by a packet to be transmitted to the I/O device, wherein
   the first selecting unit includes a first determining unit that determines whether the PCIe packet issuing request is possible to pass another PCIe packet issuing request being processed by the first request processing unit, based on a transaction identifier included in the PCIe packet issuing request.

2. The packet processing device according to claim 1, wherein,
   when the first request processing unit under processing of another PCIe packet issuing request having a same transaction identifier as a transaction identifier included in the PCIe packet issuing request is present, the first determining unit selects the first request processing unit under processing, and,
   when the first request processing unit under processing is not present, the first determining unit selects one of the plurality of first request processing units.

3. The packet processing device according to claim 1, wherein,
   when a request classification of the PCIe packet issuing request is a classification other than a completion, the first determining unit selects the second request processing unit.

4. A packet processing device being connected as a route of a plurality of I/O devices and configuring a PCIe fabric, the packet processing device comprising:

a plurality of third request processing units and a fourth request processing unit that process a transaction packet from the I/O device; and a second selecting unit that selects the plurality of third request processing units or the fourth request processing unit, based on a classification of the transaction packet, and a load exerted on the PCIe fabric by the transaction packet from the I/O device, wherein the second selecting unit includes a second determining unit that determines, when a classification of the transaction packet is a memory write request, whether the memory write request is possible to pass another memory write request being processed by the third request processing unit, based on a requester identifier included in the memory write request.

5. The packet processing device according to claim 4, wherein, when the third request processing unit under processing of another memory write request having a same requester identifier as a requester identifier included in the memory write request is present, the second determining unit selects the third request processing unit under processing, and, when the third request processing unit under processing is not present, the second determining unit selects one of the plurality of third request processing units.

6. The packet processing device according to claim 4, wherein, when a classification of the transaction packet is a request other than a memory write request, the second determining unit selects the fourth request processing unit.

7. A packet processing method for a packet processing device being connected as a route of a plurality of I/O devices and configuring a PCIe fabric, wherein the packet processing device includes a plurality of first request processing units and a second request processing unit that process a PCIe packet issuing request to the I/O device, and the packet processing method comprises selecting the plurality of first request processing units or the second request processing unit, based on a request classification of the PCIe packet issuing request, and a load exerted on the PCIe fabric by a packet to be transmitted to the I/O device, and, in case of performing the selection, determining whether the PCIe packet issuing request is possible to pass another PCIe packet issuing request being processed by the first request processing unit, based on a transaction identifier included in the PCIe packet issuing request.

* * * * *